(12) United States Patent
Komiya et al.

(10) Patent No.: US 6,509,921 B2
(45) Date of Patent: Jan. 21, 2003

(54) LIGHT BEAM SCANNING APPARATUS WITH MULTIPLE SENSORS AND PATTERNS

(75) Inventors: Kenichi Komiya, Kawasaki (JP); Koji Tanimoto, Kawasaki (JP); Jun Sakakibara, Tokyo (JP); Koji Kawai, Fujisawa (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 10 days.

(21) Appl. No.: 09/816,773

(22) Filed: Mar. 26, 2001

(65) Prior Publication Data

US 2002/0135662 A1 Sep. 26, 2002

(51) Int. Cl.$^7$ ................................................. B41J 2/435
(52) U.S. Cl. ........................................ 347/235; 347/250

(58) Field of Search .................................. 347/233, 234, 347/235, 237, 247, 248, 250; 359/235, 250, 229, 248

(56) References Cited

U.S. PATENT DOCUMENTS 5,929,891 A * 7/1999 Komiya et al. ............. 347/235

* cited by examiner

Primary Examiner—Hai Pham
(74) Attorney, Agent, or Firm—Foley & Lardner

(57) ABSTRACT

Two sawtooth sensor patterns are combined so that they engage with each other. These sensor patterns are arranged so that a light beam passes sawtooth portions in a horizontal scan direction. A light beam's scan position is determined by integrating a difference between output signals from these sensor patterns. It is possible to provide a highly sensitive circuit for processing signals from the sensors and to improve detection accuracy for light beams.

20 Claims, 26 Drawing Sheets

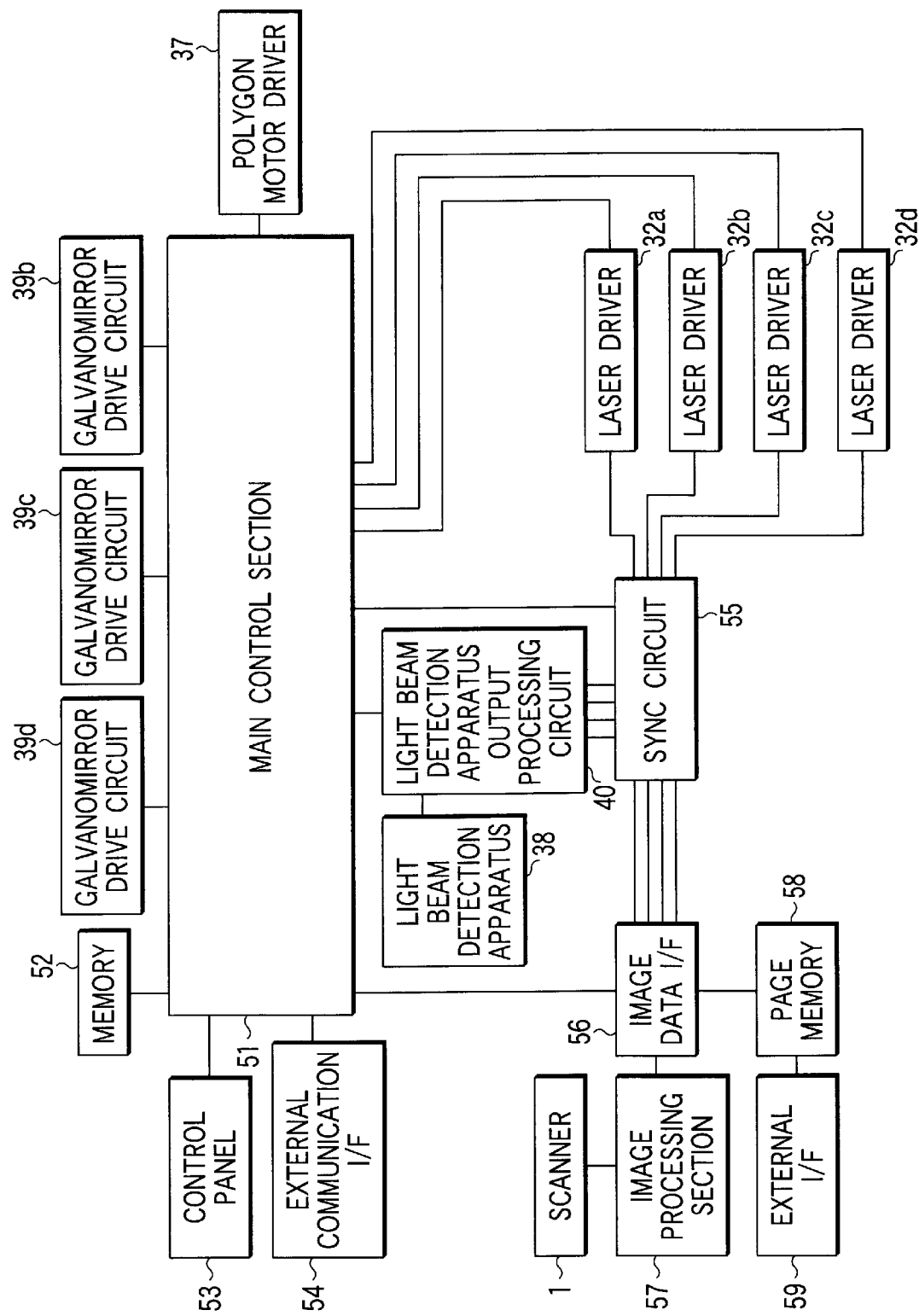
F I G. 3

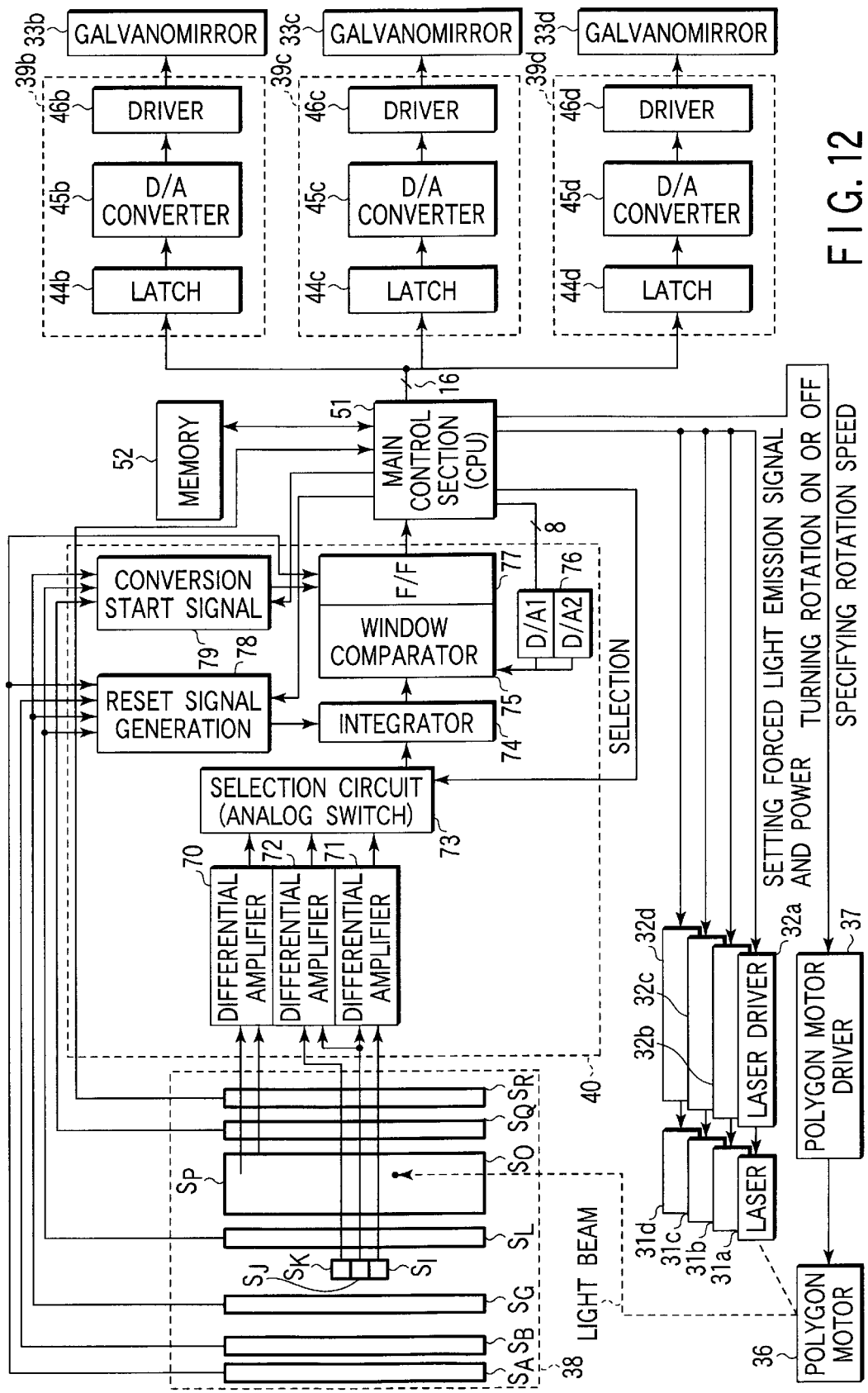
F I G. 12

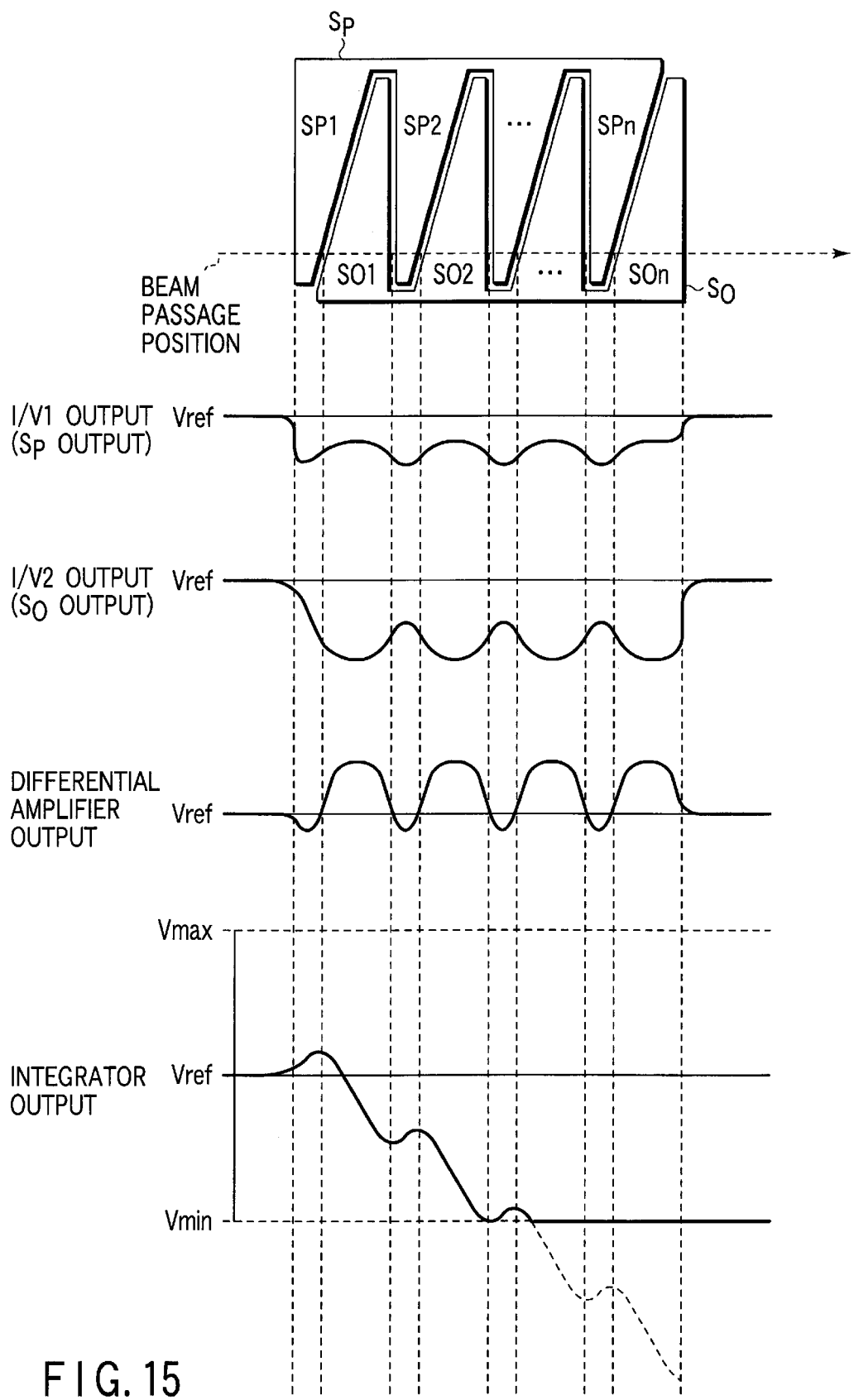
F I G. 15

LIGHT BEAM SCANNING APPARATUS WITH MULTIPLE SENSORS AND PATTERNS

BACKGROUND OF THE INVENTION

The present invention relates to a light beam scanning apparatus for scanning a plurality of laser beams in an image formation apparatus such as a digital copier or a laser printer which forms a single electrostatic latent image on a single photoconductor drum by simultaneously performing scanning and exposure on the photoconductor drum by using the plurality of laser beams.

In recent years, there have been developed various digital copiers according to scanning and exposure using a laser light beam (hereafter referred to as the light beam) and an electrophotographic process.

Recently, a multi-beam digital copier is developed for increasing an image formation speed. The multi-beam system generates a plurality of light beams and simultaneously scans a plurality of lines using these light beams.

Such a multi-beam digital copier is equipped with a semiconductor laser oscillator for generating a plurality of light beams and an optical unit as a light beam scanning apparatus. The optical unit chiefly comprises a rotating polygon such as a polygon mirror, a collimator lens and an f-θ lens for reflecting each light beam from the plurality of laser oscillators toward a photoconductor drum and scanning on a photoconductor drum using each light beam.

Conventionally, the optical unit of the multi-beam digital copier controls scanning direction exposure positions and passage positions of light beams. The scanning direction exposure position control relates to controlling light beam positions in a horizontal scan direction. The passage position control relates to controlling light beam positions in a vertical scan direction.

An embodiment of this technology is proposed in patent application Ser. No. 09/667,317. According to the embodiment, a pair of sensor patterns detects passage points of light beams scanning a photoconductor drum surface in the vertical scan direction in order to control light beam positions by detecting light beams with high precision in a wide range. These sensor patterns are, say, trapezoidal, arranged symmetrically at a position equivalent to a surface to be scanned, and parallel placed with a specified interval along the light beam scanning direction. A light beam passage point in the vertical scan direction is detected according to the value found by integrating a difference between outputs of the pair of sensor patterns.

The sensor is connected to a circuit for processing detected signals. The processing circuit uses a current/voltage conversion amplifier (I/V) to convert an output current detected by each sensor to voltage. A differential amplifier outputs a voltage difference. An integrator integrates this voltage difference.

Several methods are available for further increasing detection accuracy in the light beam scanning apparatus. For example, one method is to increase a gain of an I/V conversion amplifier for converting a sensor-detected current to a voltage and increase an output signal amplitude. Another method is to increase a differential amplifier gain and increase an amplitude of an output signal from the differential amplifier. Yet another method is to decrease an integrator's integration constant to increase the integrator sensitivity. For example, the detection accuracy can be doubled by doubling the I/V conversion amplifier gain, doubling the differential amplifier gain, or halving an integration constant (RC) of the integrator.

However, these methods for increasing the detection accuracy cause the following problems.

The following describes an example of doubling the detection accuracy by halving the integrator's integration constant RC. Since the integration constant RC is halved, the integrator sensitivity doubles. Though an output signal from the differential amplifier is unchanged, an output signal from the integrator doubles.

It is assumed that a circuit for processing output signals from the sensor comprises a single power supply (0V to 5V). A voltage approximately ranging from 1V to 4V is output from a general operational amplifier comprising the I/V conversion amplifier, the differential amplifier, or the integrator. When an output signal exceeds the maximum output voltage for such a general operational amplifier, normal operations are not ensured. The output signal remains at a power supply voltage level or a ground level. For restoring this situation to a normal state, it is necessary to turn the power off or wait for a specified time.

Namely, when an output signal from one sensor causes an integrator output to remain at the power supply voltage or at the ground level, it is impossible to correctly integrate outputs from the other sensor. This state disables detection of light beam scanning positions.

This example explains changing the integration constant. The same applies to increasing an I/V conversion amplifier gain or a differential amplifier gain. Even if a dual-supply (±supply) circuit system is used, a similar phenomenon may occur around the± power supply level.

When an attempt is made to improve the detection accuracy, a conventional light beam scanning apparatus is subject to limitations on a sensor width, operational amplifier capabilities, and the like, This may make it possible to provide desired detection accuracy.

Accordingly, on the conventional light beam scanning apparatus, further improving the detection accuracy may significantly narrow a detection range and cannot solve chronological changes due to environmental variations and the like.

BRIEF SUMMARY OF THE INVENTION

The present invention has been made in consideration of the foregoing. It is therefore an object of the present invention to provide a light beam scanning apparatus which can provide a wide range of light beam detection, improve detection accuracy, and withstand a chronological change due to environmental variations, and the like for controlling a light beam scan position.

A light beam scanning apparatus according to the present invention comprises a light emitting device for outputting a light beam; a mirror for reflecting a light beam toward a scanned face so that the light beam output from this light emitting device scans the scanned face in a horizontal scan direction; a plurality of sensors arranged on the scanned face or a position equivalent thereto for detecting a light beam scanned by the mirror and outputting an electric signal wherein the plurality of sensors comprises a pair of patterns in which one output continuously increases and the other output continuously decreases with a change of a light beam scan position in a direction orthogonal to the horizontal scan direction; a processing circuit for outputting a value obtained by integrating a difference between respective electric signals output from the pair of sensors; and a control section for controlling a passage position of a light beam output from the light emitting device on the scanned face to a specified position based on an output value from this processing circuit.

An image formation apparatus according to the present invention has an image support whose scanned face is used for scanning a light beam based on image information and forming a latent image and image formation means for forming an image formed on this image support on an image formation medium, and comprises a light emitting device for outputting a light beam; a mirror for reflecting a light beam toward a scanned face so that the light beam output from this light emitting device scans the scanned face in a horizontal scan direction; a plurality of sensors arranged on the scanned face or a position equivalent thereto for detecting a light beam scanned by the mirror and outputting an electric signal wherein the plurality of sensors comprises a pair of patterns in which one output continuously increases and the other output continuously decreases with a change of a light beam scan position in a direction orthogonal to the horizontal scan direction; a processing circuit for outputting a value obtained by integrating a difference between respective electric signals output from the pair of sensors; and a control section for controlling a passage position of a light beam output from the light emitting device on the scanned face to a specified position based on an output value from this processing circuit.

Additional objects and advantages of the invention will be set forth in the description which follows, and in part will be obvious from the description or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below serve to explain the principles of the invention.

FIG. 3 is a block diagram of an optical control system;

FIG. 12 is a block diagram of the optical control system;

FIG. 15 shows a sensor pattern output, a differential amplifier output, and an integrator output according to a light beam passage position;

DETAILED DESCRIPTION OF THE INVENTION

First to sixth embodiments of the present invention will be described in further detail with reference to the accompanying drawings.

First, portions common to the embodiments are described.

Figure 1:
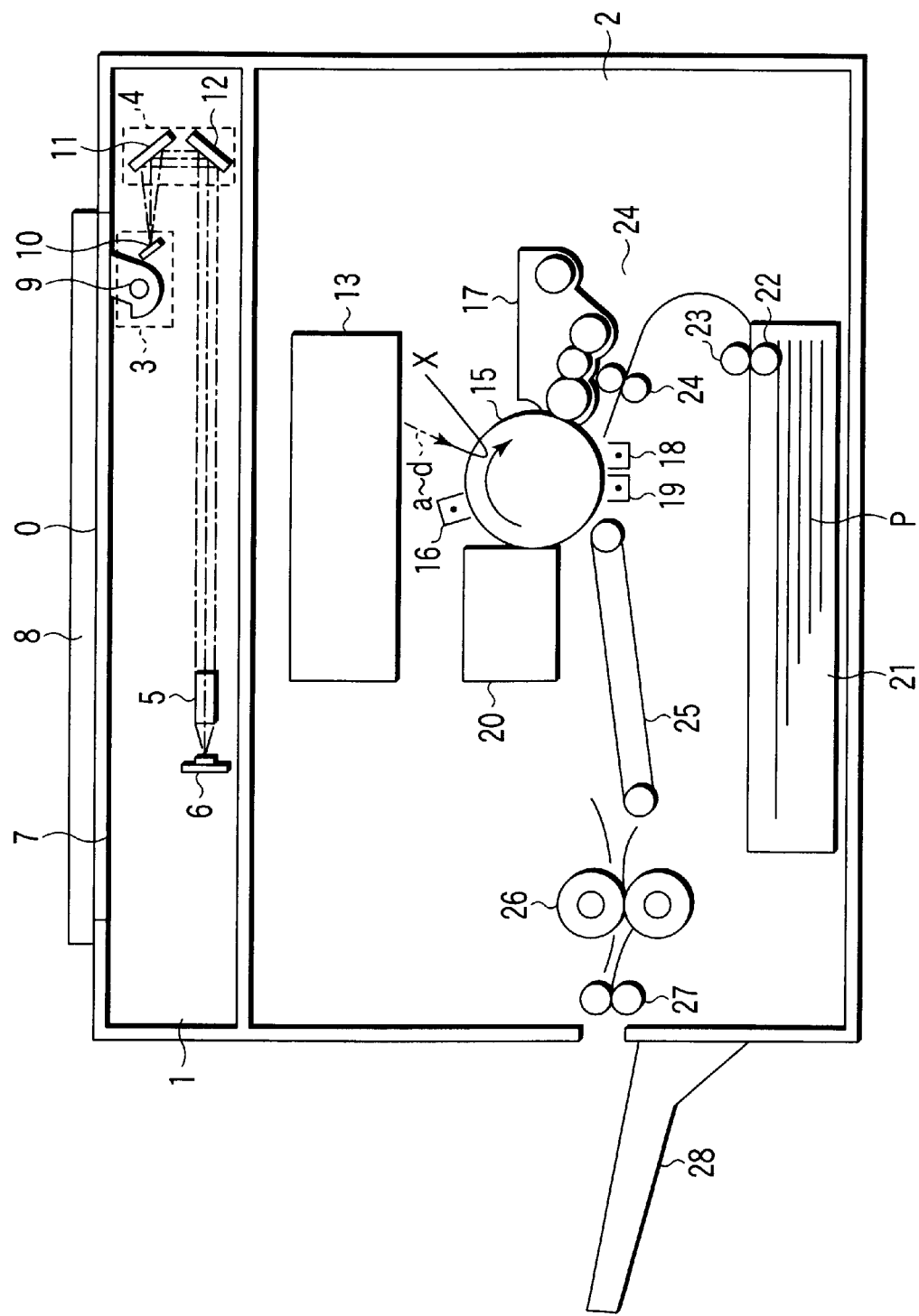
FIG. 1 shows a schematic configuration of a digital copier.

FIG. 1 schematically shows a configuration of a digital copier as an image formation apparatus to which a light beam scanning apparatus according to the present invention is applied. The digital copier comprises a scanner 1 and a printer 2. The scanner 1 functions as means for reading images. The printer 2 functions as means for forming an image on a medium on which images should be formed. The scanner 1 comprises a first carriage 3 and a second carriage 4 movable in a direction of an arrow, an image formation lens 5, and a photoelectric conversion element 6.

In FIG. 1, a document 0 is placed with its face down on a transparent document glass plane 7 and is pressed against the document glass plane 7 with a document cover 8 which opens and closes freely.

The document 0 is illuminated by a light source 9. The reflected light is condensed on a light receiving face of the photoelectric conversion element 6 via mirrors 10, 11, and 12, and the image formation lens 5. The first carriage 3 is equipped with the light source 9 and the mirror 10. The second carriage 4 is equipped with the mirrors 11 and 12. The first carriage 3 and the second carriage 4 move at a relative speed of 2:1 to always keep an optical path length constant. Driven by a carriage drive motor (not shown), the first carriage 3 and the second carriage 4 move from right to left in synchronization with a read timing signal.

The scanner sequentially reads an image of the document 0 placed on the document glass plane 7 line by line. An image processing section (not shown) converts a read output to an 8-bit digital image signal representing gradation of the image.

The printer 2 comprises a combination of an optical unit 13 and an image formation section 14 according to the electrophotography capable of image formation on paper P as an image formation medium. An image signal read by the scanner 1 from the document 0 is processed in an image processing section (not shown), and then is converted to a laser beam (hereafter referred to as the light beam) from the semiconductor laser oscillator. The image formation apparatus according to the present invention employs a multibeam optical system using a plurality of semiconductor laser oscillators, say, four oscillators.

A plurality of semiconductor laser oscillators in the optical unit 13 emits light to generate a plurality of light beams according to a laser modulation signal output from the image processing section (not shown). The plurality of light beams is reflected on a polygon mirror to become scanning light which is output outside the unit. The optical unit 13 will be detailed later.

A plurality of light beams output from the optical unit 13 is formed as spot light having necessary resolution at an exposure position X on a photoconductor drum 15 as an image support. The light is scanned on the photoconductor drum 15 in the horizontal scan direction (along the photoconductor drum's rotation axis). Further, rotating the photoconductor drum 15 forms an electrostatic latent image corresponding to the image signal on the photoconductor drum 15.

Near the photoconductor drum 15, there are provided an electrostatic charger 16, a developing machine 17, a transfer charger 18, and a release charger 19 for charging the surface thereof, a cleaner 20, and the like. The photoconductor drum 15 is rotatively driven by a drive motor (not shown) at a peripheral speed and is electrostatically charged by the electrostatic charger 16 facing the surface of the drum. A plurality of light beams is arranged in the vertical scan direction (along movement of the photoconductor drum surface) and is imaged at the exposure position X on the charged photoconductor drum 15.

The electrostatic latent image formed on the photoconductor drum 15 is developed as a toner image by means of toner (developer) from the developing machine 17. The toner image formed on the photoconductor drum 15 is transferred to paper P supplied from a paper feed system at a proper timing.

The paper feed system feeds paper from a paper feed cassette 21 mounted at the bottom by selecting a sheet of paper using a paper feed roller 22 and a separation roller 23. The paper is transported to a resist roller 24 and is fed to a transfer position at a specified timing. Downstream from the transfer charger 18, there are provided a paper transport mechanism 25, a fixer 26, and an eject roller 27 for ejecting the imaged paper P. The fixer 26 fixes the toner image transferred to the paper P which is then ejected to an external eject tray 28 via the eject roller 27.

After completion of transfer to the paper P, the cleaner 20 removes toner remaining on the surface of the photoconductor drum 15. The drum then returns to an initial state and is ready for next image formation.

By repeating the above process, an image formation operation is performed successively.

As mentioned above, the document placed on the document glass plane 7 is read by the scanner 1. The read information is subject to a series of processing in the printer 2 and is recorded on the paper P as a toner image.

The following describes the optical unit 13.

Figure 2:
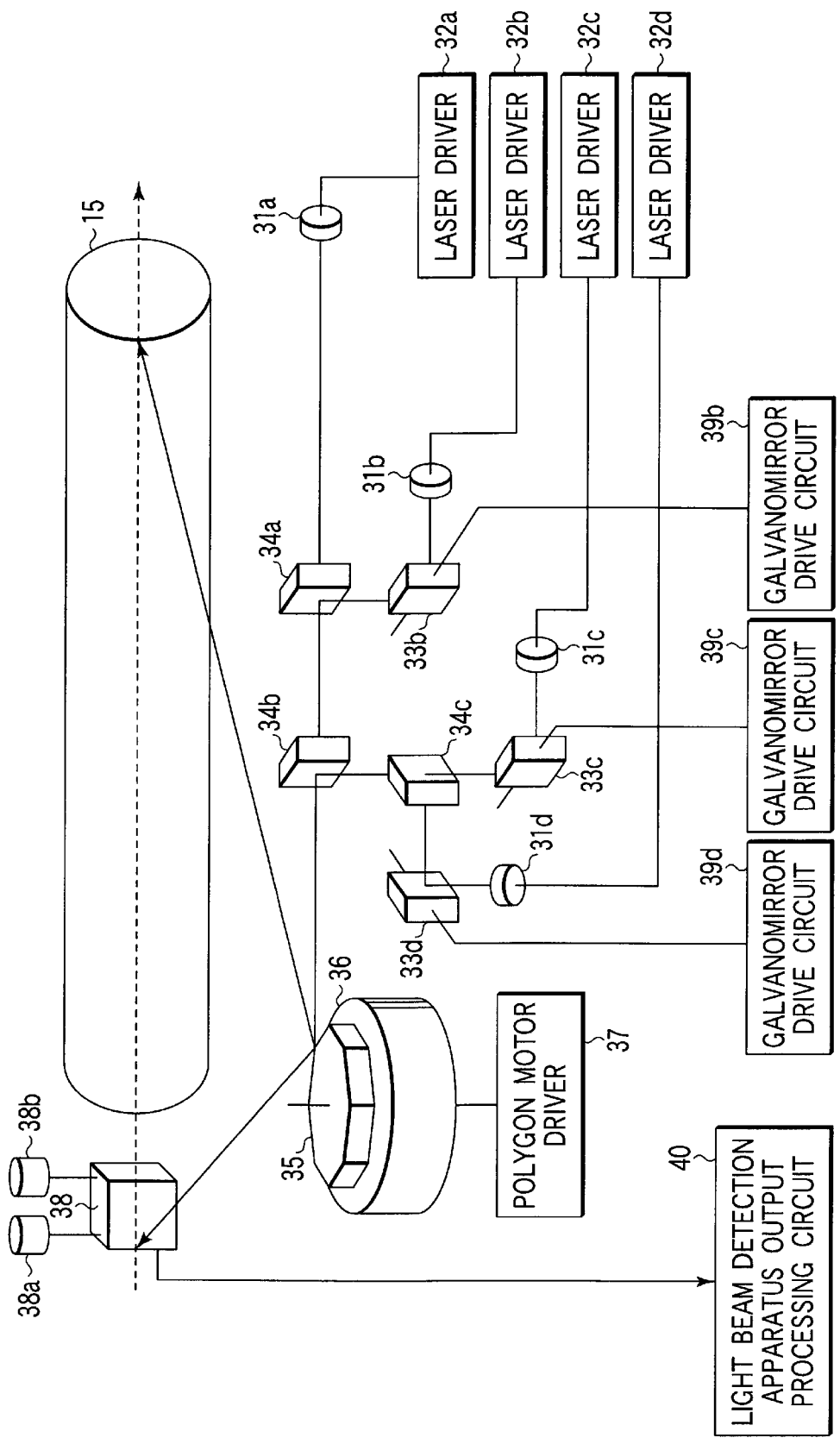
FIG. 2 shows a schematic configuration of an optical unit.

FIG. 2 shows a configuration of the optical unit 13 and positioning of the photoconductor drum 15. The optical unit 13 includes semiconductor laser oscillators 31a, 31b, 31c, and 31d as means for generating, say, four light beams. Each of the laser oscillators 31a to 31d forms an image one scanning line at a time, permitting fast image formation without significantly decreasing a polygon mirror rotation speed.

Namely, the laser oscillator 31a is driven by a laser driver 32a. An output light beam passes a collimator lens (not shown), then a half mirror 34a and a half mirror 34b, and finally enters a polygon mirror 35 as a rotating polygon.

A polygon motor 36 is driven by a polygon motor driver 37 and rotates the polygon mirror 35 at a constant speed. Light reflected on the polygon mirror 35 scans the photoconductor drum in a given direction at an angular speed determined by a rotation speed of the polygon motor 36. A light beam scanned by the polygon mirror 35 passes an f-θ lens (not shown) and scans a light receiving face of a light beam detection apparatus 38 and the photoconductor drum 15 at a constant speed according to the f-θ characteristic. The light beam detection apparatus 38 works as light beam position detection means, light beam passage timing detection means, and light beam power detection means.

A laser oscillator 31b is driven by a laser driver 32b. An output light beam passes the collimator lens (not shown) and is reflected on a galvanomirror 33b and then on the half mirror 34a. The reflected light from the half mirror 34a passes a half mirror 34b and enters the polygon mirror 35. A path following the polygon mirror 35 is same as that for the laser oscillator 31a. The light passes the f-θ lens (not shown) and scans the light beam detection apparatus 38's light receiving face and the photoconductor drum 15 at a constant speed.

A laser oscillator 31c is driven by a laser driver 32c. An output light beam passes the collimator lens (not shown) and is reflected on a galvanomirror 33c. The reflected light passes a half mirror 34c, is reflected on the half mirror 34b, and enters the polygon mirror 35. A path following the polygon mirror 35 is same as that for the laser oscillators 31a and 31b. The light passes the f-θ lens (not shown) and scans the light beam detection apparatus 38's light receiving face and the photoconductor drum 15 at a constant speed.

A laser oscillator 31d is driven by a laser driver 32d. An output light beam passes the collimator lens (not shown) and is reflected on a galvanomirror 33d. The reflected light is further reflected on the half mirrors 34c and 34b, and then enters the polygon mirror 35. A path following the polygon mirror 35 is same as that for the laser oscillators 31a, 31b, and 31c. The light passes the f-θ lens (not shown) and scans the light beam detection apparatus 38's light receiving face and the photoconductor drum 15 at a constant speed.

Each of the laser drivers 32a to 32d contains an automatic power control (APC) circuit and always drives the laser oscillators 31a to 31d with an emission power level controlled by a main control section (CPU).

Respective light beams output from the laser oscillator 31a, 31b, 31c, and 31d are synthesized through the half mirror 34a, 34b, and 34c. The four light beams advance toward the polygon mirror 35.

Accordingly, the four light beams can simultaneously scan on the photoconductor drum 15. This makes it possible to record an image four times faster than a conventional single beam, assuming that the same rotation speed is used for the polygon mirror 35.

The galvanomirrors 33b, 33c, and 33d are driven by galvanomirror drive circuit 39b, 39c, and 39d, respectively. The galvanomirrors adjust or control positions of light beams output from laser oscillators 31b, 31c, and 31d in the vertical scan direction with reference to a light beam output from the laser oscillator 31a.

The light beam detection apparatus 38 is equipped with light beam detection apparatus adjustment motors 38a and 38b for adjusting an installation position of the apparatus and an inclination of a light beam against the scanning direction.

The light beam detection apparatus 38 detects passage positions, passage timings, and powers (light volumes) of the four light beams. The light beam detection apparatus 38 is provided near the photoconductor drum 15 and has the surface level with that of the photoconductor drum 15. A detection signal from the light beam detection apparatus 38 is used for controlling the galvanomirrors 33b, 33c, and 33d corresponding to respective light beams (controlling an image formation position in the vertical scan direction), emission powers of the laser oscillators 31a, 31b, 31c, and 31d, and emission timings (controlling an image formation position in the horizontal scan direction). Details are described later. To generate a signal for these control operations, the light beam detection apparatus 38 connects with a light beam detection apparatus output processing circuit 40.

Described below is the control system.

FIG. 3 chiefly shows a configuration of a control section of the multi-beam optical system. A main control section 51 is responsible for overall control and comprises, say, a CPU. The control section 51 connects with memory 52, a control panel 53, an external communication interface (I/F) 54, laser drivers 32a, 32b, 32c, and 32d, a polygon mirror motor driver 37, galvanomirror drive circuits 39b, 39c, and 39d, a light beam detection apparatus output processing circuit 40, a sync circuit 55, and an image data interface (I/F) 56.

The sync circuit 55 connects with the image data I/F 56. The image data I/F 56 connects with an image processing section 57 and page memory 58. The image processing section 57 connects with the scanner 1. The page memory 58 connects with an external interface (I/F) 59.

The following describes a flow of image data forming an image.

During a copy operation, the scanner 1 reads an image from the document 0 placed on the document glass plane 7. The read image is sent to the image processing section 57. The image processing section 57 provides the image signal from the scanner 1 with a known shading correction, various filtering processes, gradation, gamma correction, and the like.

Image data from the image processing section 57 is sent to the image data I/F 56. The image data I/F 56 distributes image data to the four laser drivers 32a, 32b, 32c, and 32d.

The sync circuit 55 generates a clock synchronized with timing each light beam passing on the light beam detection apparatus 38. Synchronously with this clock, the image data I/F 56 sends the image data as a laser modulation signal to the laser drivers 32a, 32b, 32c, and 32d.

The sync circuit 55 includes a sample timer, a logical circuit, and the like. The sample timer forcibly operates the laser oscillators 31a, 31b, 31c, and 31d in a non-image region and controls each light beam power. When each beam scans on the light beam detection apparatus 38, the logical circuit operates the laser oscillators 31a, 31b, 31c, and 31d and detects a horizontal scan direction position of each light beam.

Transmitting image data synchronously with each light beam scanning provides image formation at a correct position in synchronization with the horizontal scan direction.

The control panel 53 is a man-machine interface for starting a copy operation or setting the number of sheets of paper.

This digital copier is capable of not only a copy operation, but also image formation of image data externally input via the external I/F 59 connected to the page memory 58. Image data externally input from the external I/F 59 is temporarily stored in the page memory 58, and then is sent to the sync circuit 55 via the image data I/F 56.

When the digital copier is externally controlled via a network, for example, the external communication I/F 54 works as the control panel 53.

The galvanomirror drive circuits 39b, 39c, and 39d drive the galvanomirrors 33b, 33c, and 33d according to a value supplied from the main control section 51. Accordingly, the main control section 51 can freely control angles of the galvanomirrors 33b, 33c, and 33d via the galvanomirror drive circuits 39b, 39c, and 39d.

The polygon motor driver 37 drives the polygon motor 36 for rotating the polygon mirror 35 which scans the four light beams. The main control section 51 instructs the polygon motor driver 37 to start or stop the rotation and change the rotation speed. When the light beam detection apparatus 38 confirms the light beam's passage position, the polygon motor 36 rotates at a lower speed than for image formation.

The laser drivers 32a, 32b, 32c, and 32d not only generate a laser beam according to image data as mentioned above, but also forcibly operate the laser oscillators 31a, 31b, 31c, and 31d independently of image data according to a forced emission signal from the main control section 51.

The main control section 51 specifies power for beams emitted from the laser oscillators 31a, 31b, 31c, and 31d by using the laser drivers 32a, 32b, 32c, and 32d, respectively. The emission power setting is changed according to a change in the process condition or detection of a light beam passage position.

The memory 52 stores information needed for control. For example, the memory stores control amounts for the galvanomirrors 33b, 33c, and 33d, a circuit characteristic (amplifier offset value) for detecting light beam passage positions, and an arrival order of light beams. Since these pieces of information are stored in the memory, the optical unit 13 can be ready for image formation immediately after power-on.

A first embodiment of the present invention is described below.

In the first embodiment, the present invention is applied to a light beam scanning apparatus having a single-beam optical system which performs a scan using a single light beam. This embodiment provides the principle of detecting and controlling a passage position of the light beam according to the present invention.

Figure 4:
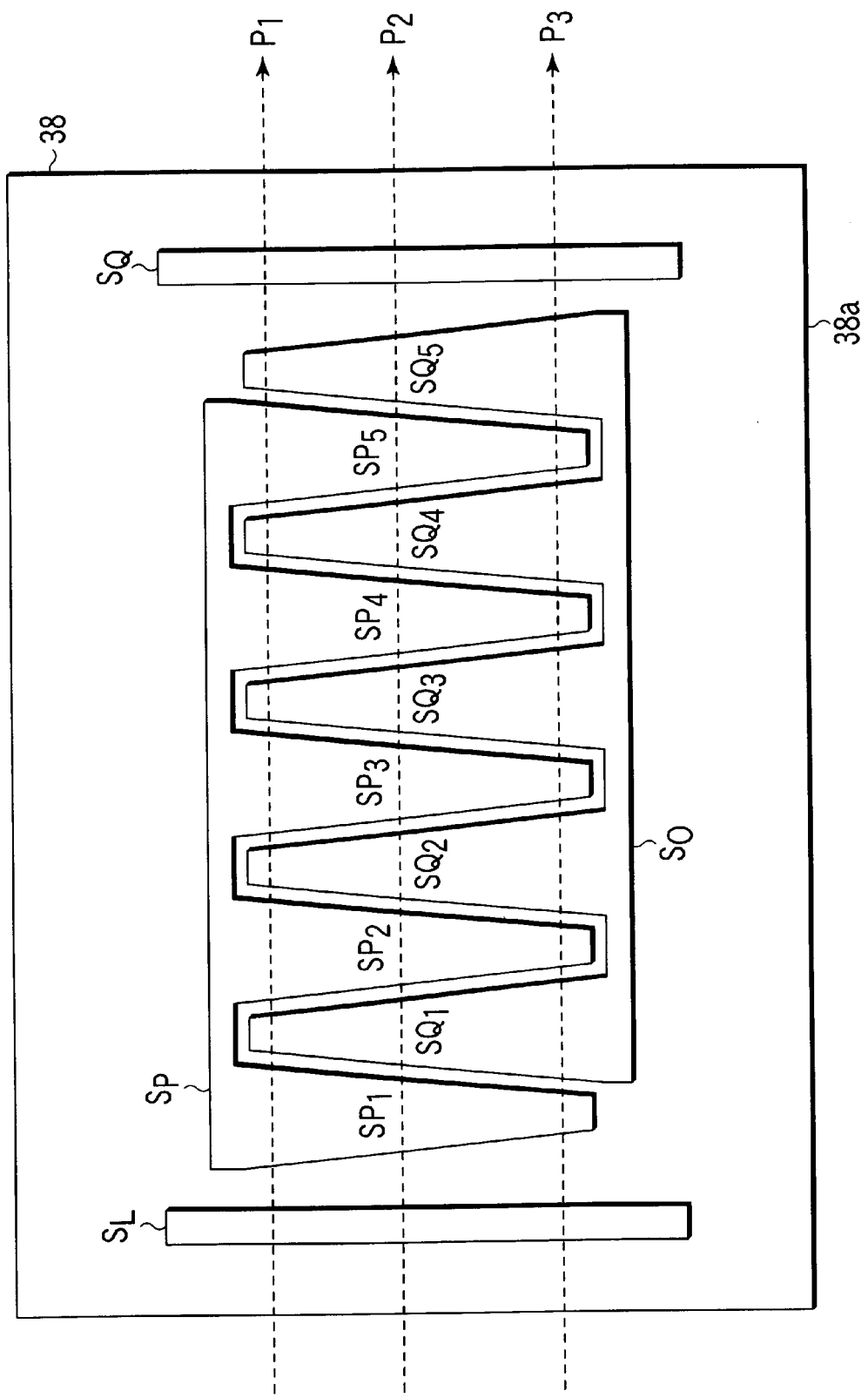
FIG. 4 shows a configuration of a beam detection apparatus.

FIG. 4 shows relationship between the light beam detection apparatus 38's configuration and a light beam's scanning direction. A light beam from one semiconductor laser oscillator is scanned by a polygon mirror 35's rotation from left to right and passes over the light beam detection apparatus 38.

The light beam detection apparatus 38 comprises a pair of longitudinal sensors $S_L$ and $S_Q$, a pair of sensor patterns (sensors) $S_P$ and $S_O$ provided between the sensors $S_L$ an $S_Q$, and a support substrate 38a for integrally supporting these sensors.

The sensor $S_L$ detects passage of the light beam and generates a reset signal (integration start signal) for an integrator to be described later. This reset signal is used for discharging an electrical charge from an integral capacitor up to the reference voltage. The integration starts upon completion of a reset operation.

Like the sensor $S_L$, the sensor $S_Q$ detects passage of the light beam and generates a conversion start signal for a signal converter (A/D converter or window comparator) which converts an analog signal to a digital signal (to be described later). The signal is used as an A/D conversion start signal for the A/D converter or as a timing signal for the window comparator. The timing signal is used for triggering a comparator output.

A pair of sensor patterns $S_P$ and $S_O$ is used for detecting a light beam's passage position. The sensor patterns $S_P$ and $S_O$ each comprise a plurality of triangular or trapezoid patterns. The sensor patterns $S_P$ and $S_O$ comprising a plurality of triangles and trapezoids are arranged so that respective triangles or trapezoids form a plurality of pairs. For example, the sensor patterns $S_P$ and $S_O$ each are formed to be sawtooth and are placed with a given gap so that these patterns engage with each other.

In the example of FIG. 4, sensor patterns $SP_1$ to $SP_5$ represent a plurality of triangular or trapezoid patterns constituting the above-mentioned sensor pattern $S_P$. Likewise, sensor patterns $SO_1$ to $SO_5$ represent a plurality of triangular or trapezoid patterns constituting the above-mentioned sensor pattern $S_O$. The sensor patterns $S_P$ and $S_O$ are arranged so that the sensor patterns $SP_1$ to $SP_5$ engage with the sensor patterns $SO_1$ to $SO_5$, respectively.

As shown in FIG. 4, the sensor pattern $SP_1$ is so formed as to increase a distance for the light beam crossing or passing sensor pattern $SP_1$, as a light beam's passage position is settled upward in the figure. Likewise, the sensor pattern $SO_1$ is so formed as to increase a distance for the light beam crossing or passing sensor pattern $SO_1$ as a light beam's passage position is settled downward in the drawing.

A passage position change is measured along the vertical scan direction, namely a direction orthogonal to the light beam scan direction (horizontal scan direction). As the passage position changes, an output from one sensor pattern ($SP_1$ or $SO_1$) continuously increases and the an output from other sensor pattern ($SO_1$ or $SP_1$) continuously decreases.

The sensor patterns $S_P$ and $S_O$ comprise light detection members such as photodiodes and are integrally configured on the support substrate 38a. When the light beam passes, it moves from left to right in FIG. 4. The light is detected in the order of sensor patterns $SP_1$, $SO_1$, $SP_2$, $SO_2$, $SP_3$, $SO_3$, $SP_4$, $SO_4$, $SP_5$, $SO_5$. The sensor patterns $S_P$ and $S_O$ generate detection outputs.

Figure 5:
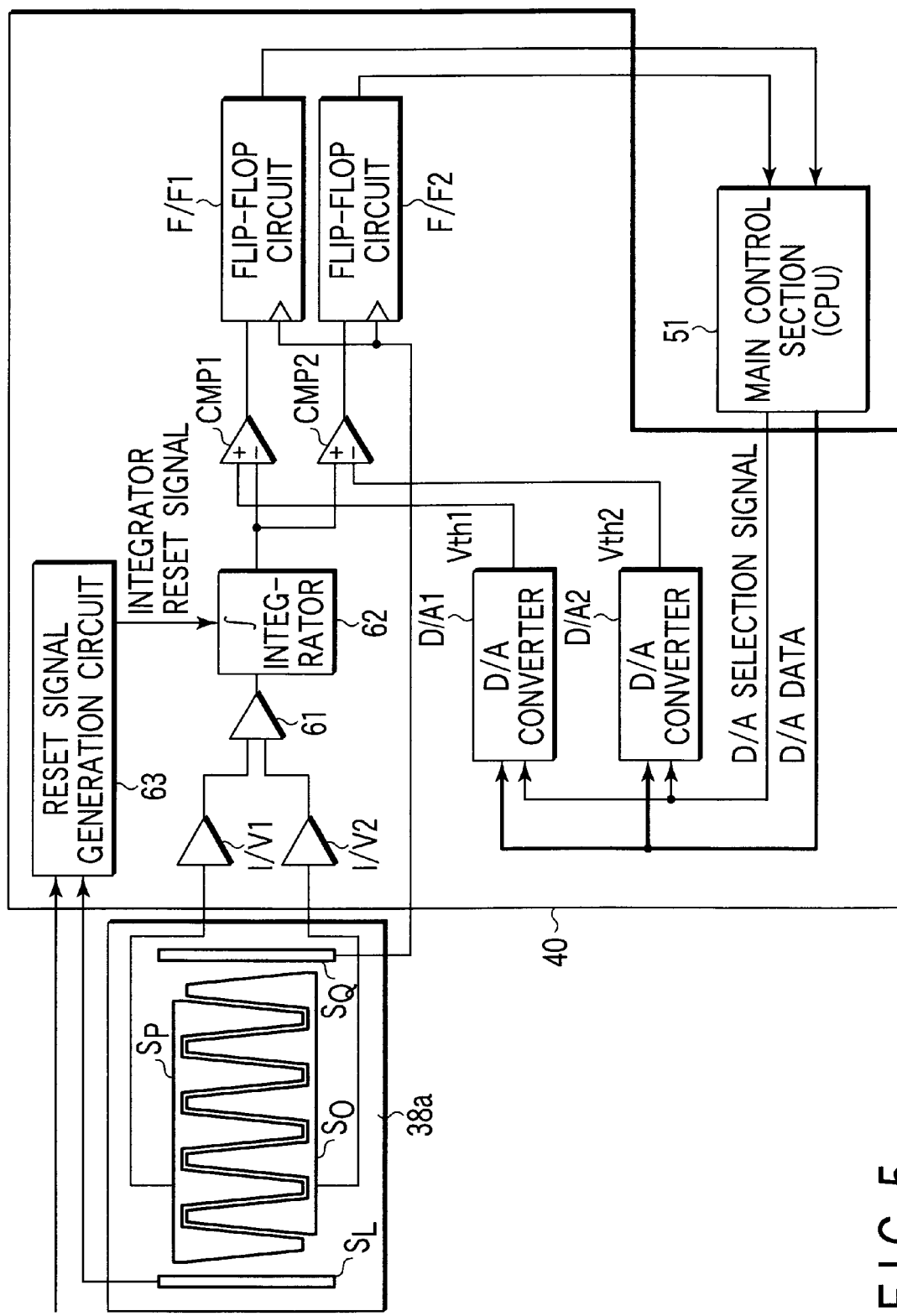
FIG. 5 is a block diagram of an output processing circuit in the beam detection apparatus.

FIG. 5 is a block diagram showing a major part of the light beam detection output processing circuit 40 using the light beam detection apparatus 38 shown in FIG. 4. This part should detect a beam position in the vertical scan direction.

As shown in FIG. 5, the major part of the light beam detection output processing circuit 40 computes a difference between the sensor patterns $S_P$ and $S_O$. Further, the light beam detection output processing circuit 40 uses an integrator to integrate a detected difference between the sensor patterns $S_P$ and $S_O$. The result integrated by the integrator is an analog voltage as an integration output and is converted to digital data by A/D conversion means. Consequently, digital data in the integration output is read by the main control section (CPU) 51.

The following details the major part of the light beam detection output processing circuit 40. Here, the description covers a detection operation for a single light beam.

The sensor patterns $S_P$ and $S_O$ output a current when the light beam passes. The sensor patterns $S_P$ and $S_O$ are connected to current/voltage conversion amplifiers IV1 and IV2, respectively. A current output from these sensors is converted to a voltage output.

An output from the current/voltage conversion amplifier (IV1, IV2) is connected to a differential amplifier 61 which computes a difference and amplifies the output with a proper gain. The amplified output is then integrated by the integrator 62.

The integrator 62 stores electrical charge in an integral capacitor and generates it as an integration output. Before use, the integral capacitor needs to be discharged. This operation is hereafter referred to as an integration reset.

The integration reset operation is performed by a reset signal which is generated by a combination of outputs from sensors on the light beam detection apparatus. The reset signal is supplied from a sensor $S_A$ (not shown) and a sensor $S_L$ and is generated from a reset signal generation circuit 63.

When the light beam passes, a signal is output from the sensors $S_A$ (not shown) and $S_L$. The integrator 62 is reset between these sensors. Just after a reset, a signal is output from the sensor patterns $S_P$ and $S_O$ and is integrated.

An output signal from the integrator 62 is input to window comparators CMP1 and CMP2 as analog/digital conversion means. The window comparator converts an integrator's output signal (analog voltage) to a digital signal. A threshold value is supplied from the main control section (CPU) 51 via D/A converters D/A1 and D/A2.

An output from the window comparator (CMP1, CMP2) is input to a flip-flop circuit (F/F1, F/F2) and is triggered here. A pulse signal is output from a sensor pattern $S_Q$ and is input to the flip-flop circuit (F/F1, F/F2). The $S_Q$ output timing (pulse signal rise) holds the output from the window comparator (CMP1, CMP2).

An output from the flip-flop circuit (F/F1, F/F2) is sent to the CPU 51. The CPU 51 connects with an output signal from a timing sensor SR (not shown) on the beam detection apparatus 38. This signal functions as an interrupt signal. The CPU 51 reads data from the flip-flop circuit (F/F1, F/F2) each time the CPU receives an interrupt signal (output signal) from the timing sensor $S_R$.

Detailed below is the window comparator (CMP1, CMP2). As shown in FIG. 5, an output from the integrator 62 is supplied to, say, an inverting input of the comparator CMP1 and to a non-inverting input of the comparator CMP2. One output $V_{th1}$ from the D/A converter (D/A1) is connected to the comparator CMP1's non-inverting input. The other output $V_{th2}$ from the D/A converter (D/A2) is connected to the comparator CMP2's inverting input.

The CPU 51 supplies the window comparators CMP1 and CMP2 with thresholds $V_{th1}$ and $V_{th2}$ via the D/A converter (D/A2). When an output voltage from the integrator 62 is smaller than the threshold $V_{th1}$ and is larger than the $V_{th2}$, the comparators both CMP1 and CMP2 output "1s". When an output from the window comparators CMP1 and CMP2, namely flip-flop circuits F/F1 and F/F2, is "1, 1", the CPU 51 assumes that an output from the integrator 62 exists in a window between the thresholds $V_{th1}$ and $V_{th2}$. The CPU correctly determines an integrator 62's output voltage, namely the light beam passage position by gradually decreasing the window width. Based on the thus acquired light beam passage position, the main control section 51 controls the light beam's passage position.

Though not shown in the figure, there are actually provided a current/voltage conversion amplifier for converting sensor pattern's output currents to voltage values and a signal processing circuit such as a binarization circuit for binarizing current/voltage conversion amplifier outputs.

Described below are operations when a light beam passes the light beam detection apparatus 38 in FIG. 4 with reference to FIG. 5.

A light beam is scanned by the polygon mirror 35 in the direction of the arrow in the figure. The sensors $S_L$, $S_P$, $S_O$, and $S_Q$ generate currents as the light beam passes. A current output from the sensor pattern $S_L$ is converted to a voltage value by the current/voltage conversion amplifier (not shown) and is binarized by the binarization circuit (not shown). The binarized signal is input to the reset signal generation circuit 63. This circuit synthesizes the binarized signal and an output signal from the $S_A$ sensor (not shown) to generate a reset signal. This reset signal is input to the integrator 62 to reset it. The reset signal also functions as a clear signal for the flip-flop circuits F/F1 and F/F2 to clear them.

When the light beam passes the sensor patterns $S_P$ and $S_O$, these sensors output pulse currents corresponding to positions scanned by the light beam. These output currents are converted to voltage values by the current/voltage conversion amplifiers IV1 and IV2. A difference between voltage-converted signals is amplified by the differential amplifier 61 and is integrated by the integrator 62. An output from the integrator 62 is input to the window comparators CMP1 and CMP2 functioning as analog/digital converters. The input is compared with the specified threshold via the D/A converters D/A1 and D/A2 and is converted to a digital signal.

When the light beam passes the sensor $S_Q$, an output current from the sensor $S_Q$ is converted to a voltage value by the current/voltage conversion amplifier (not shown) and then is binarized by the binarization circuit. The binarized signal is input to the flip-flop circuits F/F1 and F/F2. The leading edge of the binarized signal allows the flip-flop circuits F/F1 and F/F2 to trigger outputs from the window comparators CMP1 and CMP2.

A signal from the sensor pattern $S_R$ (not shown) is input to the main control section 51 as an interrupt signal. Using this signal, the main control section 51 reads outputs from the window comparators CMP1 and CMP2, namely the flip-flop circuits F/F1 and F/F2.

Described below is a case where the light beam's passage position is P2.

Figure 6:
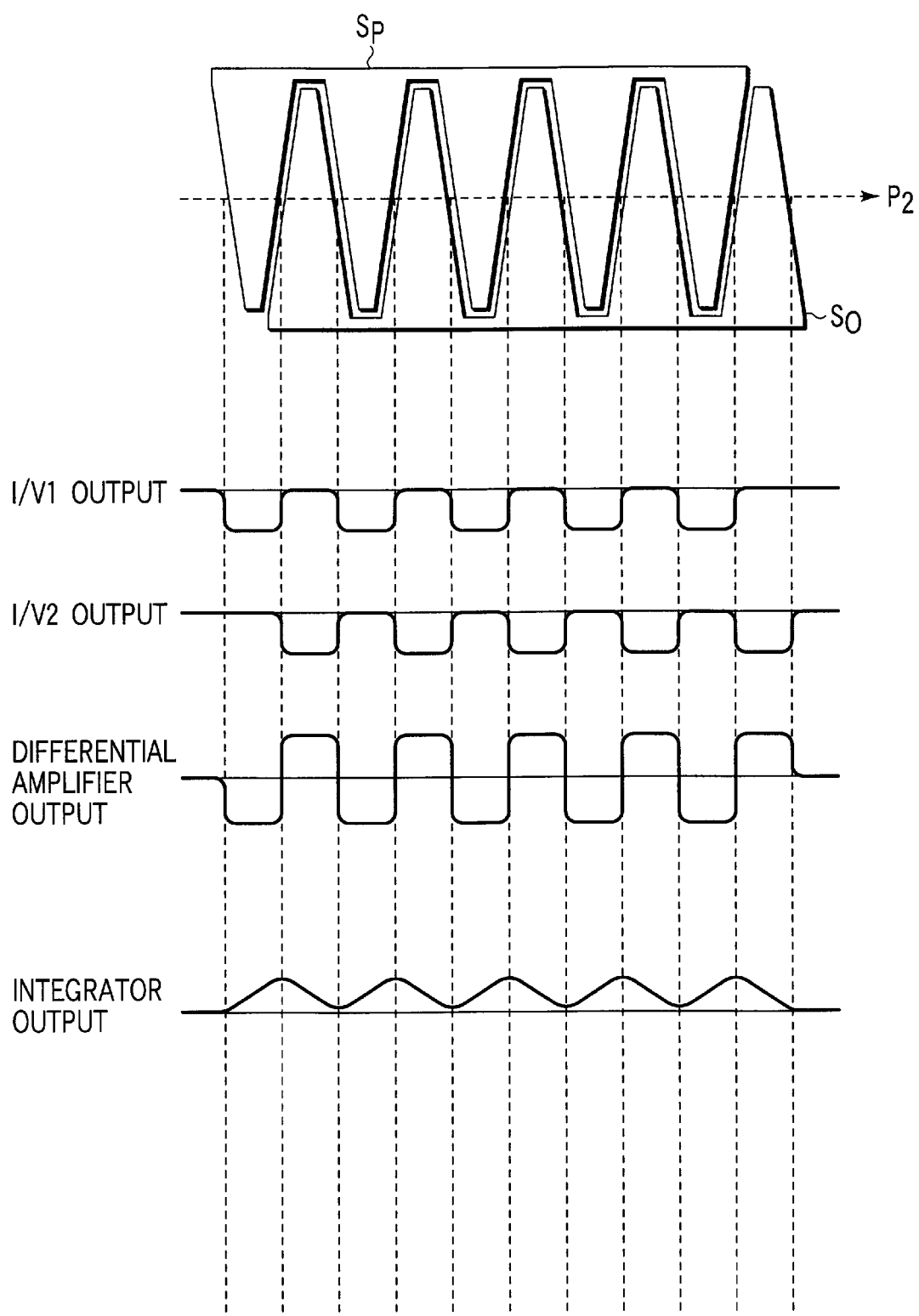
FIG. 6 shows a sensor pattern output, a differential amplifier output, and an integrator output according to a light beam passage position.

FIG. 6 shows signals from processing circuit components when a light beam passes an approximate center (P2) of the vertical scan direction for the $S_P$ and the $S_O$.

As shown in FIG. 6, the light beam passage position is approximately centered at P2 on the sensor patterns $S_P$ and $S_O$. Accordingly, the light beam travels the same distance on the sensor patterns $SP_1$ to $SP_5$ of the sensor pattern $S_P$ and on the sensor patterns $SO_1$ to $SO_5$ of the sensor pattern $S_O$. Namely, the current/voltage conversion amplifiers I/V1 and I/V2 output phase-shifted signals with almost equal pulse widths.

The differential amplifier 61 computes a difference between outputs from the current/voltage conversion amplifiers I/V1 and I/V2 and generates an output amplified with a specified gain. The differential amplifier 61's output is integrated by the integrator 62 with combinations of ($SP_1$ and $SO_1$), ($SP_2$ and $SO_2$), ($SP_3$ and $SO_3$), ($SP_4$ and $SO_4$), and ($SP_5$ and $SO_5$). Consequently, the output signal from the integrator 62 finally becomes identical to the reference voltage (Vref) for the processing circuit.

When the light beam passage position is P2, the differential amplifier 61 outputs a signal with the equal amplitude and the reverse direction. An integration result becomes ±0 against the reference voltage.

Figure 7:
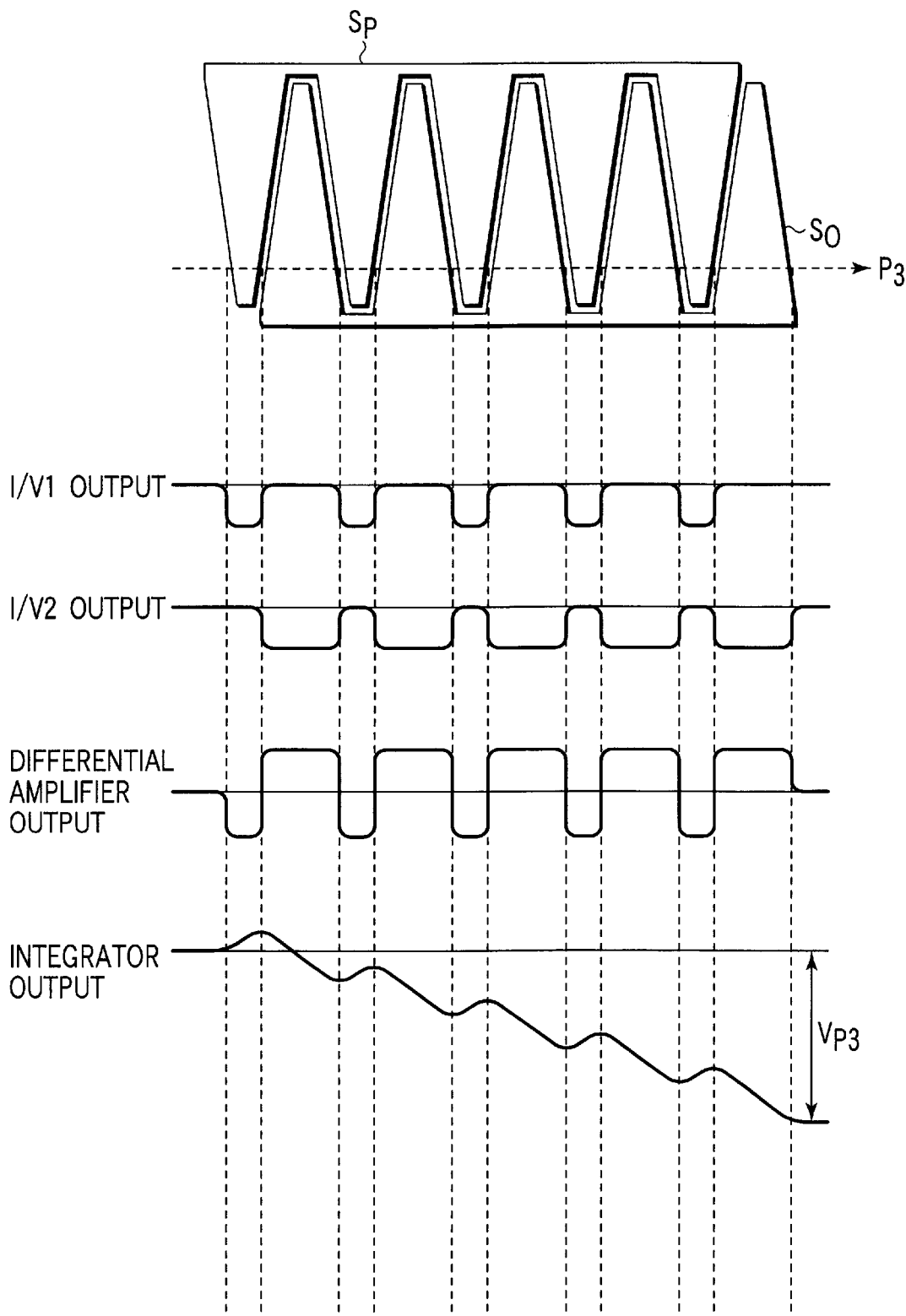
FIG. 7 shows a sensor pattern output, a differential amplifier output, and an integrator output according to a light beam passage position.

FIG. 7 shows signals from processing circuit components when a light beam passes a position P3 below the center (P2) of the vertical scan direction for the $S_P$ and the $S_O$.

As shown in FIG. 7, the light beam passage position is set to the position P3 below the approximate center P2 of the sensor patterns $S_P$ and $S_O$. When the light beam passes these sensor patterns, the distance for the sensor patterns $SO_1$ to $SO_5$ of the sensor pattern $S_O$ becomes longer than the distance for the sensor patterns $SP_1$ to $SP_5$ of the sensor pattern $S_P$.

As regards outputs from the current/voltage conversion amplifiers, the current/voltage conversion amplifier I/V2 generates a signal with a longer pulse width. Therefore, an output from the differential amplifier 61 looks like as shown in the figure. Like FIG. 6, the differential amplifier 61's output is integrated by the integrator 62 in pairs such as ($SP_1$ and $SO_1$), ($SP_2$ and $SO_2$), ($SP_3$ and $SO_3$), ($SP_4$ and $SO_4$), and ($SP_5$ and $SO_5$). An output signal from the integrator 62 is repeatedly increased and decreased according to an output from the differential amplifier 61. The output signal finally becomes $-V_{P3}$ which is output below the reference voltage Vref.

When the light beam passage position is set to a position P1 above the center position P2, an integration result is the reverse of that for the position P3 in FIG. 7. In the case of the position P1, an output signal from the integrator 62 finally becomes $+V_{P3}$ which is output above the reference voltage Vref.

Accordingly, this processing circuit 40 outputs the reference voltage Vref when a light beam passage position is set to the center position P1 for the sensor patterns $S_P$ and $S_O$. The processing circuit 40 outputs a value larger than the reference voltage Vref when a light beam passage position is set to the position P1 above the center position P1. The processing circuit 40 outputs a value smaller than the reference voltage vref when a light beam passage position is set to the position P3 below the center position P1.

It is possible to detect a light beam passage position by integrating a differential signal between outputs from the sensor patterns $S_P$ and $S_O$.

Figure 8:
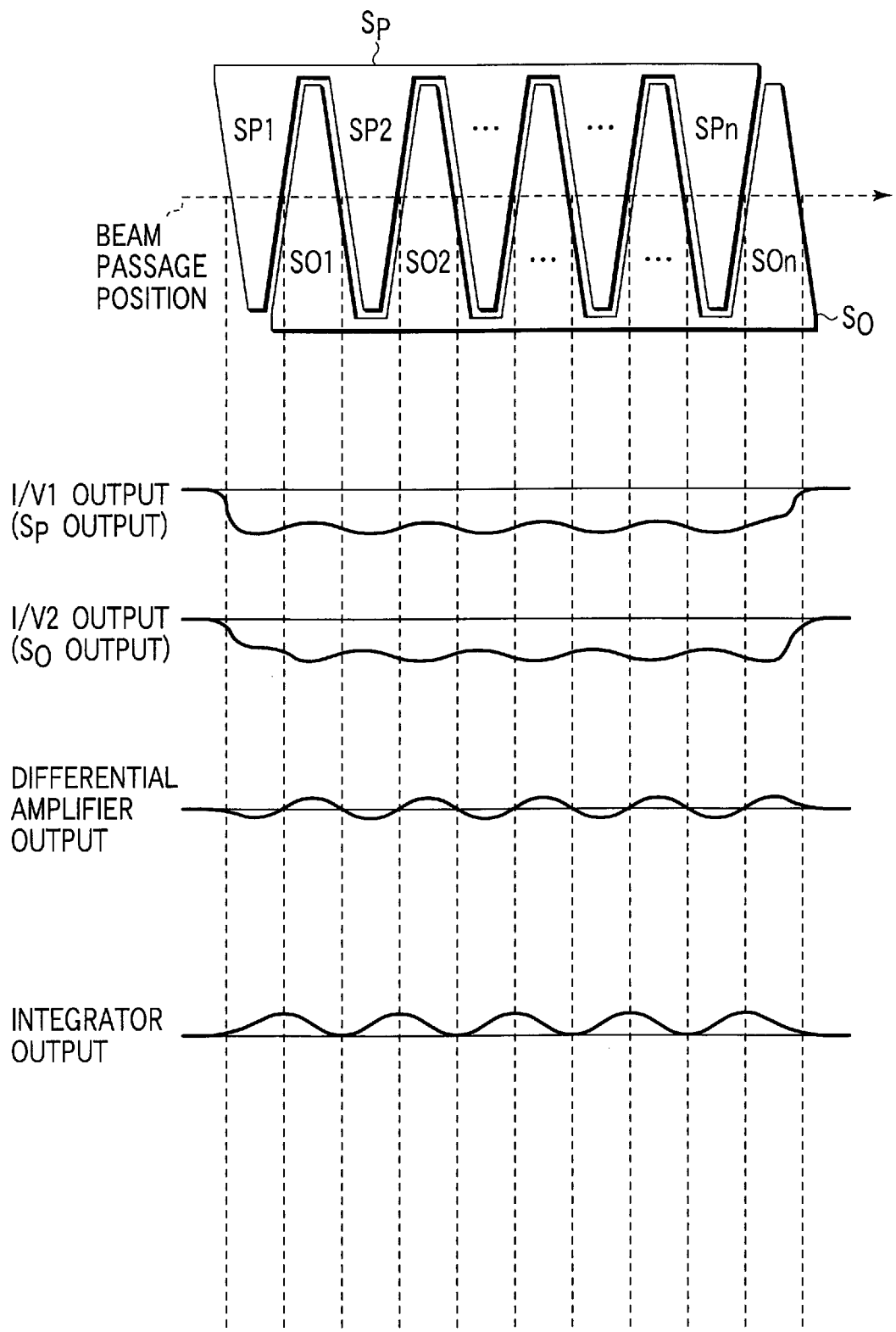
FIG. 8 shows a sensor pattern output, a differential amplifier output, and an integrator output according to a light beam passage position.
Figure 9:
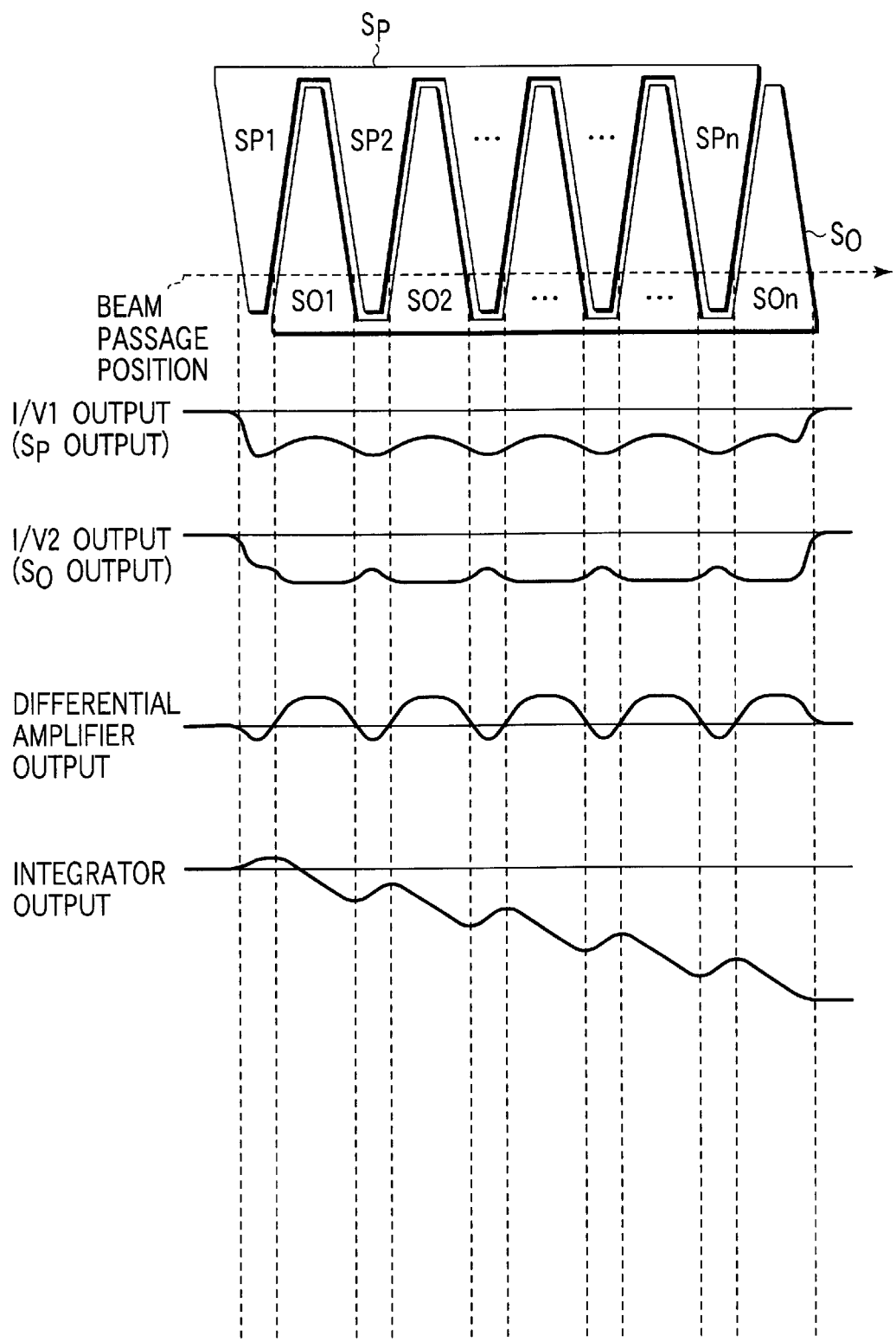
FIG. 9 shows a sensor pattern output, a differential amplifier output, and an integrator output according to a light beam passage position.

FIGS. 8 and 9 show cases where the sensor patterns $S_P$ and $S_O$ comprise a sawtooth sensor pattern which is sufficiently smaller than a beam diameter. When the light beam passage position is set to the center position P1 as shown in FIG. 8, the light beam detection apparatus output processing circuit 40 outputs the reference voltage Vref like in FIG. 6. When the light beam passage position is set to the center position P3 below the center position P1 as shown in FIG. 9, the light beam detection apparatus output processing circuit 40 outputs a value smaller than the reference voltage Vref like in FIG. 7.

Operations of the light beam detection apparatus output processing circuit 40 in FIGS. 8 and 9 are same as those in FIGS. 6 and 7. Detailed description of operations is omitted.

Figure 10:
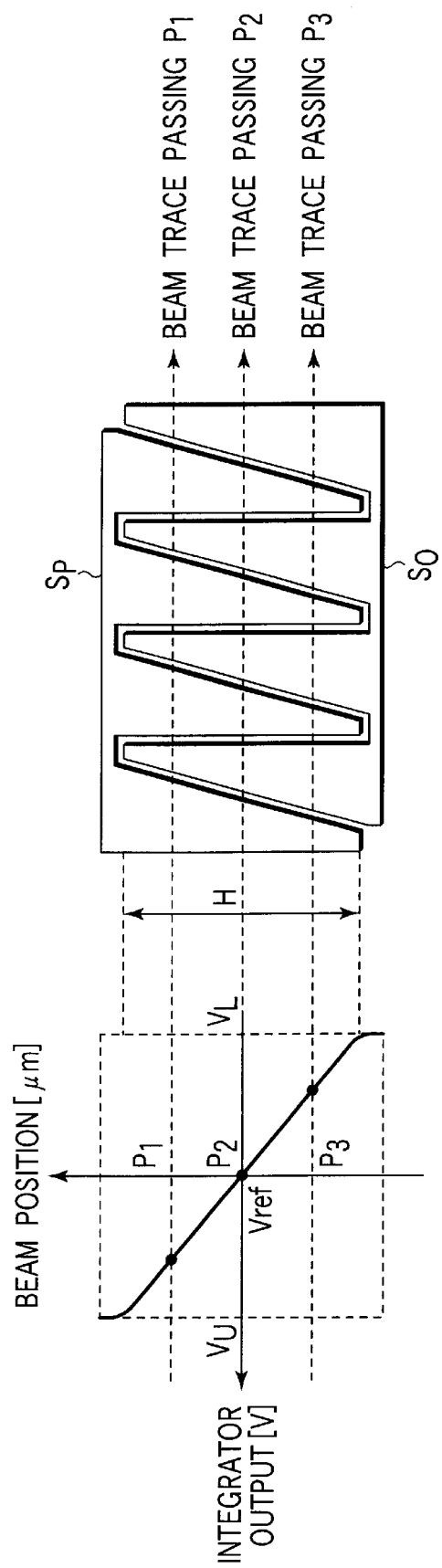
FIG. 10 shows relationship between a light beam passage position and an integration output.

FIG. 10 shows relationship between a light beam position scanned on the sensor patterns $S_P$ and $S_O$ and an output value from the integrator 62. It is seen from FIG. 10 that the integrator 62's output deviates from the reference voltage Vref as a light beam scan position on the sensor patterns $S_P$ and $S_O$ deviates from the center. It is possible to determine how a light beam scan position deviates from the center by comparing an output from the integrator 62 with the reference voltage Vref.

As mentioned above, a pair of sawtooth optical sensors is combined to detect the same distance at the center. An output from one sensor is reversed and is integrated with an output from the other sensor.

The embodiment decreases a possibility that an integration output remains at the power supply voltage level or the ground level to prevent a normal detection operation when a light beam just passes either sensor. Accordingly, it is possible to improve the accuracy in detecting a light beam passage position by maintaining a wide range of detection.

Described below is the second embodiment of the present invention.

The second embodiment applies the present invention to a light beam scanning apparatus having a multi-beam optical system instead of the light beam detection apparatus 38 in FIG. 4. The multi-beam optical system performs a scan using a plurality of light beams, say, four light beams. The first embodiment has already explained the principle of detecting and controlling a light beam passage position. The description thereof is omitted here. The multi-beam optical system configuration is already explained with reference to FIG. 2. The description thereof is also omitted here.

Described below is multi-beam passage position control using the light beam detection apparatus 38 in FIG. 4. The multi-beam optical system uses four laser oscillators. This embodiment assumes a 4-beam multi-beam optical system having four actuators (galvanomirrors in this example) for moving light beams in the vertical scan direction. It is assumed that the multi-beam optical system has 600 dpi resolution.

As explained in the first embodiment, the light beam detection apparatus 38 has the detection characteristic as shown in FIG. 7. The integration output is approximately $|V_U-V_L|/H=V_{unit}[V/\mu m]$. For providing a 4-beam pitch with the 600 dpi resolution, galvanomirrors just need to be adjusted so that integration outputs for adjacent light beams produce a difference of approximately Vunit×42.3[V].

When a first light beam is targeted to pass the position P2, for example, a first laser oscillator is activated and a polygon mirror is rotated. A galvanomirror for the first light beam is operated so that the light beam passes within the sensor pattern. When the light beam is adjusted to pass within the sensor pattern, the galvanomirror is used to adjust a first light beam passage position so that an integration output becomes Vref.

Then, a second light beam passage position is adjusted. A second laser oscillator is activated and the polygon mirror is rotated. Like the first light beam, a galvanomirror for the second light beam is operated so that the light beam passes within the sensor pattern. Thereafter, the galvanomirror for the second light beam is used to adjust the second light beam passage position so that an integration output becomes Vref-$V_{unit}$×42.3[V].

These operations control a pitch of 42.3[$\mu$m] between passage positions for the first and second light beams. Likewise, galvanomirrors for the third and fourth light beams are adjusted so that integration outputs for the adjacent light beams produce a difference of approximately $V_{unit}$×42.3[V] equivalent to 42.3[$\mu$m].

The above-mentioned operations control a pitch of 42.3 [$\mu$m] between the four light beam passage positions. Thus, it is possible to control four light beam passage positions to a specified pitch.

Described below is the third embodiment of the present invention.

Like the second embodiment, this third embodiment applies the present invention to a light beam scanning apparatus having a multi-beam optical system. However, unlike the second embodiment, at least one of a plurality of light beams is fixed. Based on this fixed light beam passage position, the third embodiment controls the remaining light beam passage positions to a specified pitch (relative position control).

Figure 11:
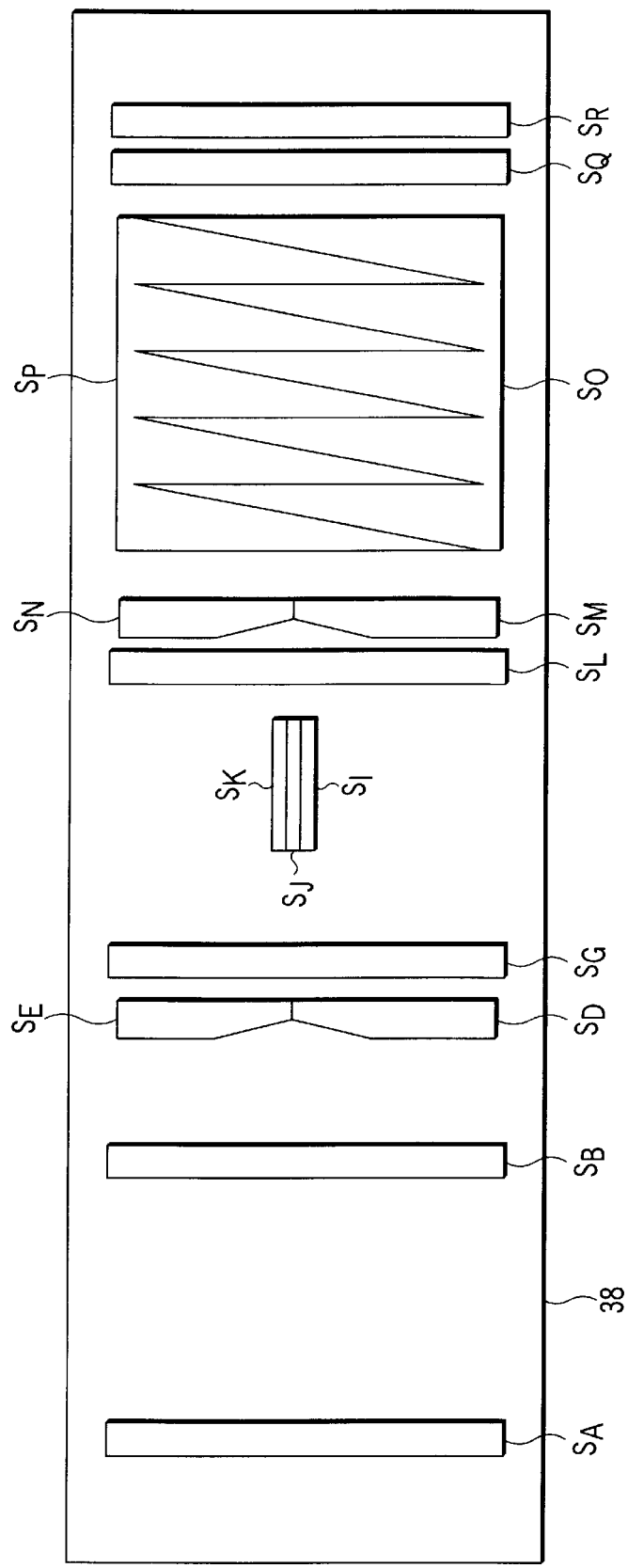
FIG. 11 shows a schematic configuration of the beam detection apparatus.

FIG. 11 shows a configuration of the light beam detection apparatus 38 according to this embodiment. The light beam detection apparatus 38 comprises sensors and sensor patterns configured on the support substrate 38a. Long sensors $S_A$, $S_B$, $S_G$, $S_L$, $S_Q$, and $S_R$ are arranged in a direction orthogonal to the light beam scan direction. Long sensors $S_I$, $S_J$, and $S_K$ are arranged in the light beam scan direction. The sensor patterns $S_P$ and $S_O$ are configured in the same manner as described for the first and second embodiments.

In FIG. 11, outputs from the two sensors $S_A$ and $S_L$ generate a reset signal for the integrator 62. Further, an output signal from the sensor $S_Q$ determines timing for converting an integration output (analog signal) to a digital signal. An output signal from the sensor $S_R$ determines timing for reading into the main control section 51.

The sensors $S_I$, $S_J$, and $S_K$ adjust intervals between light beams in the vertical scan direction. The sensors $S_I$, $S_J$, and $S_K$ are approximately centered on the support substrate 38a in the vertical scan direction and are placed parallel at a 42.3[$\mu$m] pitch (600 dpi resolution). A first passage target is a gap G1 between the sensors $S_J$ and $S_K$ in the vertical scan direction. The sensors $S_J$ and $S_K$ are used for confirming that a light beam passes the first passage target. A second passage target is a gap G2 between the sensors $S_I$ and $S_J$ in the vertical scan direction. The sensors $S_I$ and $S_J$ are used for confirming that a light beam passes the second passage target.

Sensors $S_D$, $S_E$, $S_M$, and $S_N$ are patterns for detecting a relative inclination of the light beam to be scanned against the light beam detection apparatus 38. The sensors $S_D$ and $S_E$ are placed vertically and are paired. Likewise, the sensors $S_M$ and $S_N$ are placed vertically and are paired.

Centers of these pairs are positioned on the same line.

FIG. 12 diagrams a configuration of the light beam detection apparatus output processing circuit 40 using the light beam detection apparatus 38 in FIG. 11 and peripheral sections for the light beam detection apparatus output processing circuit 40 shown in FIGS. 2 and 3.

Output signals from the sensor patterns $S_O$ and $S_P$ are input to corresponding input terminals of the differential amplifier 70. Output signals from the sensors $S_I$ and $S_J$ are input to corresponding input terminals of the differential amplifier 71. Output signals from the sensors $S_J$ and $S_K$ are input to corresponding input terminals of the differential amplifier 72. The main control section (CPU) 51 can set amplification factors for the differential amplifiers 70, 71, and 72.

Output signals from the differential amplifiers 70, 71, and 72 are sent to a selection circuit (analog switch) 73. Using a sensor selection signal from the main control section 51, the selection circuit (analog switch) 73 selects one of these output signals to be input to the integrator 74. The signal selected by the selection circuit 73 is input to the integrator 74 and is integrated here.

An output signal from the integrator 74 is input to a window comparator 75. The window comparator 75 converts an integration output (analog signal) from the integrator 74 to a digital signal. The window comparator 75 is provided with a threshold by the main control section 51 via a D/A converter 76. The D/A converter 76 comprises two D/A converter (D/A1 and D/A2).

An output from the window comparator 75 is sent to a flip-flop circuit (F/F) 77. The flip-flop circuit (F/F) 77 triggers an output from the window comparator 75. An output from the flip-flop circuit (F/F) 77 is sent to the main control section 51.

An output signal from the sensor $S_A$ is sent to a flip-flop circuit 77 as a clear signal. Output signals from the sensors $S_A$, $S_H$, and $S_L$ are sent to a reset signal generation circuit 78. In response to a selection signal from the main control section 51, the reset signal generation circuit 78 generates a reset signal from output signals of the sensors $S_A$, $S_H$, and $S_L$. The integrator 74 is reset by the reset signal and starts integration.

Output signals of the sensors $S_L$ and $S_Q$ are sent to the conversion start signal circuit 79. In response to a selection signal from the main control section 51, the conversion start signal circuit 79 selects one of the output signals of the sensors $S_L$ and $S_Q$. The selected signal is sent to the flip-flop circuit 77 as a conversion start signal. A sensor $S_R$'s output signal is sent to the main control section 51 as an interrupt signal.

After receiving the interrupt signal from the sensor $S_R$, the main control section 51 reads an output from the flip-flop circuit 77 to obtain the latest light beam passage position information. Based on the thus obtained light beam passage position information, the main control section 51 operates control amounts for the galvanomirrors 33b, 33c, and 33d. The operation results are stored in memory 52 as needed and are sent to the galvanomirror drive circuits 39b, 39c, and 39d.

The galvanomirror drive circuits 39b, 39c, and 39d are provided with latches 44b, 44c, and 44d for maintaining the operation results. Once the main a control section 51 writes data, these latches trigger the data until the data is updated next.

The data triggered by the latches 44b, 44c, and 44d is converted to an analog signal (voltage) by D/A converters 45b, 45c, and 45d and is input to drivers 46b, 46c, and 46d for driving galvanomirrors 33b, 33c, and 33d. The drivers 46b, 46c, and 46d drive the galvanomirrors 33b, 33c, and 33d according to the analog signals (voltages) input from the D/A converters 45b, 45c, and 45d.

Accordingly, this embodiment can control a light beam passage position by operating the semiconductor laser oscillator which generates a light beam to be controller, reading an output from the window comparator 75, and controlling the galvanomirrors 33b, 33c, and 33d based on the read information.

Though not shown in FIG. 12, there are provided a current/voltage conversion amplifier for converting an output current of each sensor to a voltage value and a signal processing circuit such as a binarization circuit for binarizing an output from the current/voltage conversion amplifier.

In the configuration of FIG. 12, when the sensor patterns $S_P$ and $S_O$ are used for detecting and controlling a light beam passage position, the main control section 51 issues a selection signal to the selection circuit 73 for Selecting the differential amplifier 70. By doing so, the main control section 51 selects the sensor pattern $S_P$ and $S_O$. Likewise, the main control section 51 sends a sensor selection signal to the reset signal generation circuit 78 and the conversion start signal circuit 79. By doing so, the main control section 51 generates a reset signal for the integrator 74 and a digital/analog conversion start signal. The integrator 74's reset signal rises at the leading edge of a sensor $S_A$ output and falls at the trailing edge of a sensor $S_H$ output. The conversion start signal is generated from an output signal of the sensor $S_L$.

The sensors $S_I$ and $S_J$ or the sensors $S_J$ and $S_K$ can be used for detecting and controlling a light beam passage position. In this case, the main control section 51 sends a selection signal to the selection circuit 73 for selecting a differential amplifier circuit 71 or 72. By doing so, the main control section 51 selects a pair of the sensors $S_I$ and $S_J$ or a pair of sensors $S_J$ and $S_K$. Similarly, the main control section 51 sends a sensor selection signal to the reset signal generation circuit 78 and the conversion start signal circuit 79. By doing so, the main control section 51 generates a reset signal for the integrator 74 and a digital/analog conversion start signal. In this case, the integrator 74's reset signal rises at the leading edge of a sensor $S_A$ output and falls at the trailing edge of a sensor $S_L$ output. The conversion start signal is generated from an output signal of the sensor $S_Q$.

Whichever sensor is selected, the sensor $S_R$'s signal output timing is used for the main control section 51 to read an integration output of the integrator 74 triggered by the flip-flop circuit 75.

Figure 13:
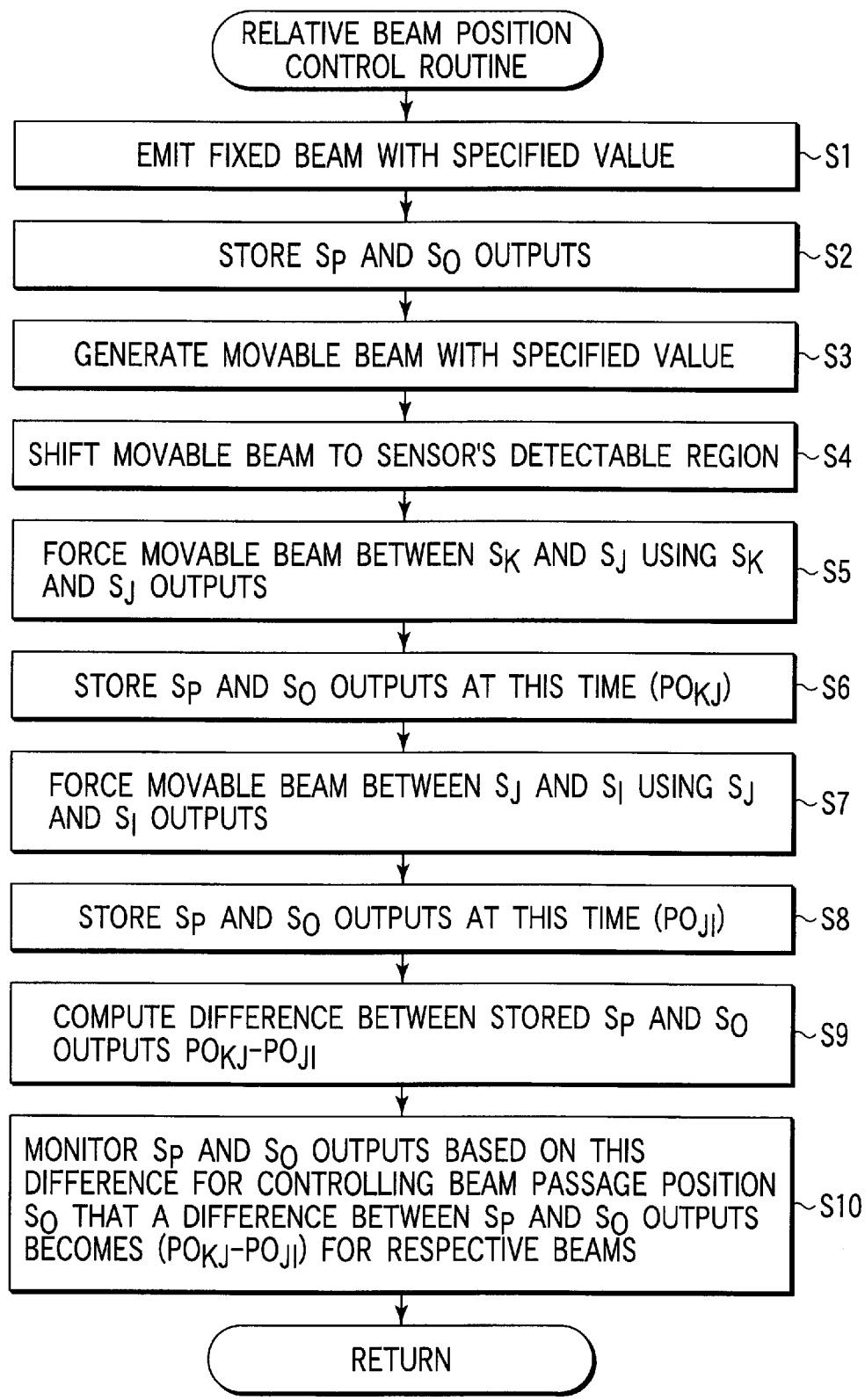
FIG. 13 is a flowchart showing a relative beam position control routine.

As mentioned above, one of four light beams is fixed. Accordingly, three galvanomirrors move the remaining three light beams in the vertical scan direction. Namely, the second, third, and fourth light beams correspond to the galvanomirrors 33b, 33c, and 33d, respectively Described below is relative position control of a light beam in the multi-beam optical system according to the third embodiment with reference to the flowchart in FIG. 13. This flowchart explains operations of the circuits configured as shown in FIG. 12.

The main control section 51 generates a fixed light beam with a specified power (step S1). Namely, the main control section 51 sends a specified value to the first laser driver 32a to activate the first laser oscillator 31a with a specified power. By doing so, the main control section 51 outputs a first light beam. In addition, the main control section 51 rotates the polygon mirror 35.

The main control section 51 then issues a selection signal to the selection circuit 73 for selecting the differential amplifier 70. The main control section 51 thus sends a differential output between the sensor patterns $S_P$ and $S_O$ to the integrator 74. Likewise, the main control section 51 sends a sensor selection signal to the reset signal generation circuit 78 and the conversion start signal circuit 79. By doing so, the main control section 51 generates a reset signal for integrating a differential signal between the sensor patterns $S_P$ and $S_O$ and an analog/digital conversion start signal. This step allows the main control section 51 to incorporate a differential output between the sensor patterns $S_P$ and $S_O$.

After completion of the above setting, the main control section 51 reads a differential output between the sensor patterns $S_P$ and $S_O$ (step S2). Namely, the main control section 51 detects a passage position of the first light beam (fixed light beam) as the reference using the differential output between the sensor patterns $S_P$ and $S_O$. Based on the first light beam's passage position detected at this step the following steps proceed so that the remaining three light beam passage positions provide a specified pitch, say, 42.3 µm.

The main control section 51 then generates the moveable second light beam with a specified power (step S3). For example, the main control section 51 sends a specified value to the second laser driver 32b to activate the second laser oscillator 31b with a specified power.

The main control section 51 monitors a differential output between the sensor patterns $S_P$ and $S_O$. Therefore, the main control section 51 can keep track of the second light beam's passage position. The main control section 51 operates the galvanomirror 33b so that the second light beam passes within a detection region for the sensor patterns $S_P$ and $S_O$. Thereafter, the main control section 51 operates the galvanomirror 33b so that the second light beam passes near the center of the sensor patterns $S_P$ and $S_O$. It should be noted that high precision is not required for the light beam passage position adjustment at this step.

The main control section 51 controls the second light beam coarse adjusted at step S4 so that its passage position is centered on a gap between the sensors $S_K$ and $S_J$. The sensors $S_I$, $S_J$, and $S_K$ are approximately centered between the sensor patterns $S_P$ and $S_O$. Accordingly, the main control section 51 can center the light beam passage position on the gap between the sensors $S_K$ and $S_J$ without excessively varying that position and consuming time. Detailed below is processing at step S5.

The main control section 51 sends a selection signal to the selection circuit 73 for selecting the differential amplifier 71. Doing so supplies the integrator 74 with a differential output between the sensors $S_K$ and $S_J$. Likewise, the main control section 51 sends a sensor selection signal to the reset signal generation circuit 78 and the conversion start signal circuit 79. By doing so, the main control section 51 generates a reset signal for integrating a differential signal between the sensors $S_K$ and $S_J$ and an analog/digital conversion start signal. This setting enables the main control section 51 to incorporate the differential output between the sensors $S_K$ and $S_J$.

The main control section 51 then operates the galvanomirror 33b for the second light beam and provides control to center the second light beam passage position on the gap between the sensors $S_K$ and $S_J$. For operating the galvanomirror 33b, the main control section 51 first places a specified value in the D/A converter 45b. A signal analog-converted by the D/A converter 45b is input to the driver 46b which outputs a current corresponding to the D/A converted value to the galvanomirror 33b. The galvanomirror 33b operates according to an output current value of the driver 46b. Accordingly, the main control section 51 can change the second light beam passage position by modifying the specified value for the D/A converter 45b.

The main control section 51 re-reads a differential output between the sensor patterns $S_P$ and $S_O$ (step S6) without changing the setting for the galvanomirror 33b at step S5. The main control section 51 stores the value ($PO_{KJ}$) in the memory 52.4

After the second light beam is centered on the gap between the sensors $S_K$ and $S_J$ at step S6, the main control section 51 then centers this light beam on the gap between the sensors $S_J$ and $S_I$ at step S7.

The main control section 51 sends a selection signal to the selection circuit 73 for selecting the differential amplifier 72. Doing so supplies the integrator 74 with a differential output between the sensors $S_J$ and $S_I$. Likewise, the main control section 51 sends a sensor selection signal to the reset signal generation circuit 78 and the conversion start signal circuit 79. By doing so, the main control section 51 generates a reset signal for integrating a differential signal between the sensors $S_J$ and $S_I$ and an analog/digital conversion start signal. This setting enables the main control section 51 to incorporate the differential output between the sensors $S_J$ and $S_I$.

The main control section 51 operates the galvanomirror 33b for the second light beam to center the second light beam passage position on the gap between the sensors $S_J$ and $S_P$ like step S5.

When the second light beam passes the center of the gap between the sensors $S_J$ and $S_I$, the main control section 51 re-reads a differential output between the sensors $S_P$ and $S_O$ and stores its value ($PO_{JI}$) in the memory (step S8).

Then, the main control section 51 operates a difference between the value $PO_{KJ}$ in the memory 52 stored at step S6 and the value $PO_{JI}$ in the memory 52 stored at step S8 (step S9). A pitch of 42.3 µm is provided between the center of sensors $S_K$ and $S_J$ and the center of sensors $S_J$ and $S_I$. When the light beam is moved from step S5 (step S6) to step S7 (step S8), the moving distance is equivalent to 42.3 µm. The difference between $PO_{KJ}$ and $PO_{JI}$ operated at this step equals the difference between differential outputs from the sensor patterns $S_P$ and $S_O$ and is equivalent to the moving distance (42.3 µm) for the second light beam.

The main control section 51 then controls a pitch of 42.3 µm between the passage position of the fixed light beam (first light beam) and that of the moveable second light beam. This step uses a differential output between the sensor patterns $S_P$ and $S_O$.

The process at step S2 has already detected the passage position of the first light beam (fixed light beam). The main control section 51 operates the galvanomirror 33b to control the second light beam passage position so that the moveable second light beam passage position provides a pitch of 42.3 µm with reference to the first light beam.

The main control section 51 changes the second light beam passage position so that the value found at step S9 ($PO_{KJ}$–$PO_{JI}$) matches a difference between the differential value stored at step S2 and the differential value between the sensor patterns $S_P$ and $S_O$ indicating the second light beam passage position.

The above-mentioned operation maintains a pitch of 42.3 µm between the first and second light beam passage positions. A similar operation provides a pitch of 42.3 µm between the third and fourth light beam passage positions.

According to the first, second, and third embodiments, two sawtooth sensor patterns are combined in an engaged fashion and are arranged so that a light beam crosses sawtooth portions in the horizontal scan direction.

This configuration makes it possible to increase a gain for the current/voltage converter in the circuit for detecting light beam positions, increase a differential amplifier gain, and make an integrator's integration constant sensitive.

When an attempt is made to improve the detection accuracy, the first, second, and third embodiments can prevent saturation of an integration output as a result of detecting an amount of deviation from the light beam center. This can solve the problem that the integration output remains at the power supply voltage or the ground level to prevent a normal integration operation or light beam control.

Namely, the first, second, and third embodiments make it possible to detect light beam positions in a wide range and improve accuracy in detecting a light beam position.

As described in the second and third embodiments, the light beam scanning apparatus having a plurality of light beams can improve detection accuracy. It is possible to provide a light beam scanning apparatus which can precisely control positions of a plurality of light beams.

Described below are fourth, fifth, and sixth embodiments.

The first, second, and third embodiments can improve detection accuracy more effectively than the prior art. When the first, second, and third embodiments are used to improve the detection accuracy maximumly, however, an integration output may become incorrect due to characteristics of an operational amplifier constituting the integrator.

Figure 14:
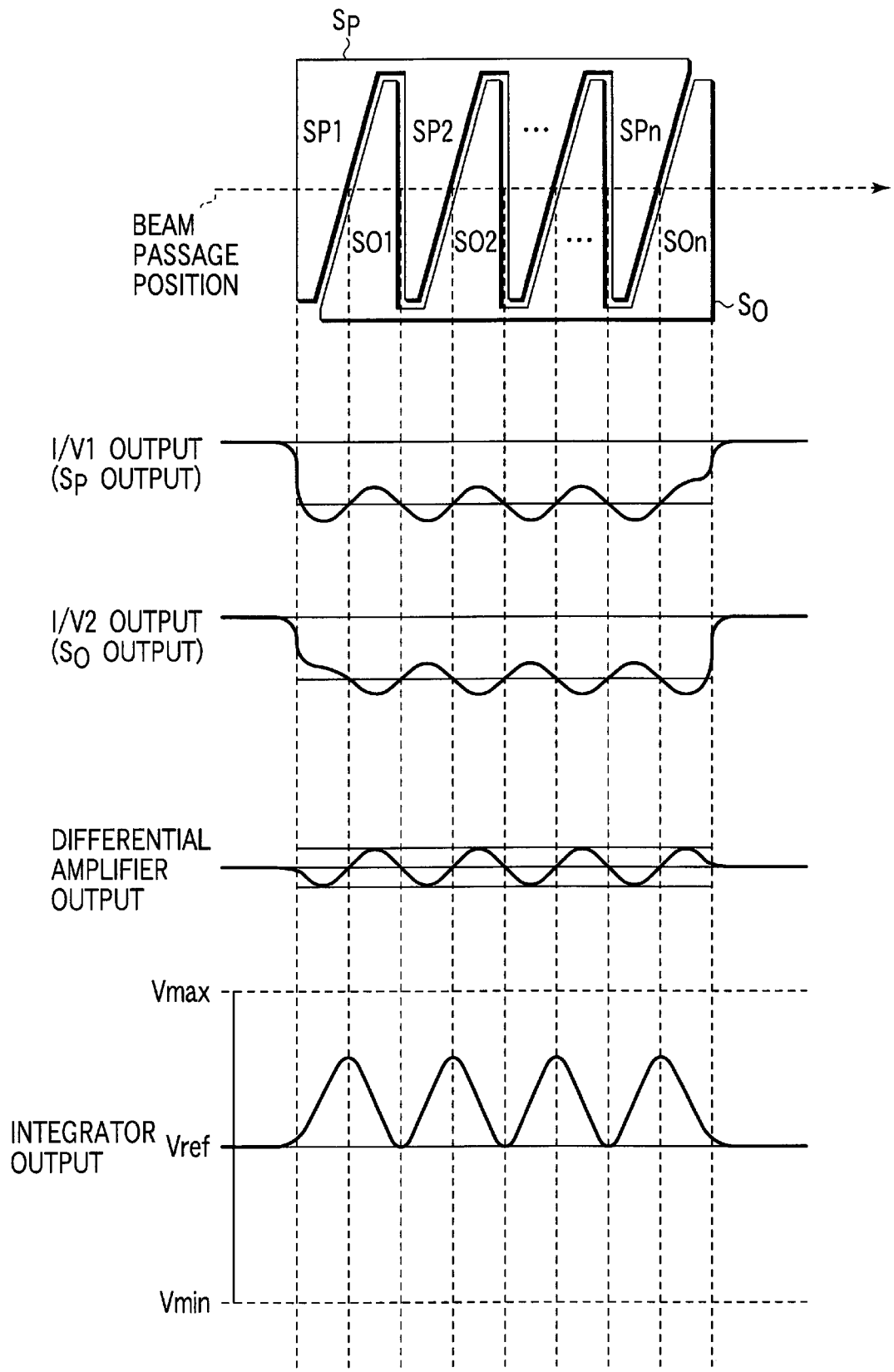
FIG. 14 shows a sensor pattern output, a differential amplifier output, and an integrator output according to a light beam passage position.

For further improving the detection accuracy in FIG. 8, FIGS. 14 and 15 provide examples of increasing gains of the current/voltage conversion amplifiers (I/V1 and I/V2) and moreover sensitizing the integration constant RC. FIG. 14 shows that a light beam passes almost the center of the sensor patterns $S_P$ and $S_O$. The example in FIG. 14 increases gains of the current/voltage conversion amplifiers (I/V1 and I/V2), also increasing amplitudes of outputs from the current/voltage conversion amplifiers I/V1 and I/V2 compared to those in FIG. 8. These outputs are current-voltage converted outputs from the sensor patterns $S_P$ and $S_O$. In addition, the differential amplifier 61 produces an increased output amplitude. Since the integration constant RC is set to a small value for more sensitivity, the integrator 62 produces an output several times larger than that in FIG. 8. Since the beam passage position approximately corresponds to the center position of the sensor patterns $S_P$ and $S_O$, an integration output finally becomes the reference voltage Vref.

FIG. 15 shows outputs from respective circuit components when the light beam passage position is shifted downward from the center. Since the light beam passage position is lowered, the sensor pattern $S_P$ outputs a decreased amplitude in the current/voltage conversion amplifier I/V1. By contrast, the sensor pattern $S_O$ outputs an increased output in the current/voltage conversion amplifier I/V2. Accordingly, an output of the differential amplifier 61 is largely measured above the Vref. When the integrator 62 integrates the differential amplifier 61's output, this means alternate integration of outputs from the sensor patterns $S_P$ and $S_O$. Since the sensor pattern $S_O$ produces a large output, the integration output is measured below the Vref.

As already mentioned above, however, this system comprises a single power supply. Because of this, an integration output becomes saturated and fixed near Vmin (ground), preventing further integration below Vmin. If there is no restrictions on a power supply voltage, for example, an integration operation should continue as indicated with a broken line in the drawing. Actually, however, the integration stops at Vmin. This prevents a normal integration operation and accurate detection of a light beam passage position. It takes some time to restore a normal operation from this state. In the worst case, the power supply voltage needs to be removed temporarily. The same may occur when the light beam passes above the center in the figure. In this case, an integration output remains at Vmax, disabling a normal integration operation.

The fourth to sixth inventions described below can solve this problem.

The fourth embodiment of the present invention is explained hereinafter.

The fourth embodiment causes no saturation in an integration output, making it possible to provide and control the beam detection in a wide range with high precision. Namely, the integrator is fixed to the power supply voltage or the ground level because a large input signal is supplied to the integrator. The input signal's amplitude and output time mostly determine a large or small input signal to the integrator 62.

The first, second, and third embodiments use sawtooth sensor patterns with respect to the time during which an integrator's input signal is output. These embodiments shorten the time for signal output from each sensor pattern by providing a pair of sensor patterns with many sawtooth sensors.

Further, the first, second, and third embodiments alternately supply the integrator 62 with signals having different output directions by alternately combining a pair of sensor patterns. The integrator 62 prevents saturation by alternately integrating signals having different output directions. However, if a signal with a much greater amplitude is input to the integrator 62, the first, second, and third embodiments may not be able to provide a solution.

The fourth embodiment concerns an amplitude of an input signal for the integrator 62. By controlling an input signal amplitude, the embodiment prevents saturation of an output signal from the integrator 62 and provides a wide-range, high-precision light beam detection and control system.

Detailed below is the fourth embodiment.

Figure 16:
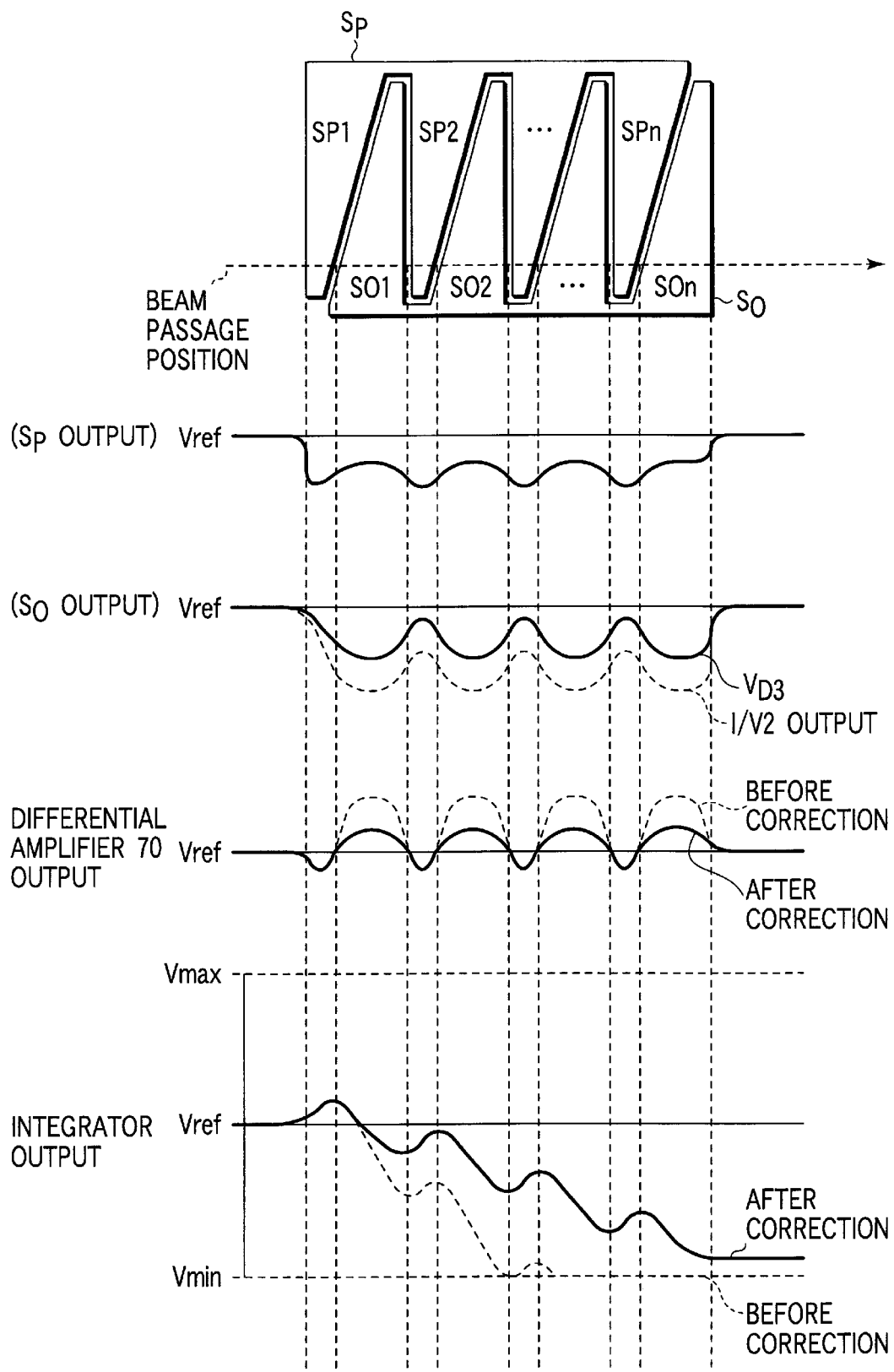
FIG. 16 shows a sensor pattern output, a differential amplifier output, and an integrator output according to a light beam passage position.

FIG. 16 shows an example of controlling an amplitude of an input signal to the integrator 62 under the same conditions as in FIG. 14. In FIG. 16, a broken line indicates that no amplitude is controlled in an input signal to the integrator 62. A solid line indicates that an amplitude is controlled in that signal.

When the light beam scan position crosses below the center of a pair of sawtooth sensor patterns $S_O$ and $S_P$, the lower sensor pattern $S_O$ provides a greater output. As shown with a broken-line wave in FIG. 16, the integrator 62's output is fixed to Vmin when the lower sensor pattern $S_O$'s output exceeds a specified value. This is because the sensor pattern $S_O$'s output increases according to the amplitude and the time. Saturation of an integrator 62's output can be prevented by decreasing the output signal amplitude for the sensor pattern $S_O$ to the extent that the integrator 62's output is not saturated.

In FIG. 16, the sensor pattern $S_O$'s output is decreased to a signal level for $V_{D3}$. As shown in the figure, the differential amplifier 61's output level decreases from the state before correction (broken line) to the state after correction (solid line). Accordingly, the integrator 62's output is not saturated.

When the light beam passage position goes below the center of the sensor patterns $S_O$ and $S_P$, saturation of an integrator 62's output, if any, is corrected so that the lower sensor pattern $S_O$ decreases an output signal amplitude. When the light beam passage position goes above the center of the sensor patterns $S_O$ and $S_P$, saturation of an integrator 62's output, if any, is corrected so that the upper sensor pattern $S_P$ decreases an output signal amplitude. Thus, it is possible to provide control to produce a normal integrator output without saturating the integrator 62's output.

Figure 17:
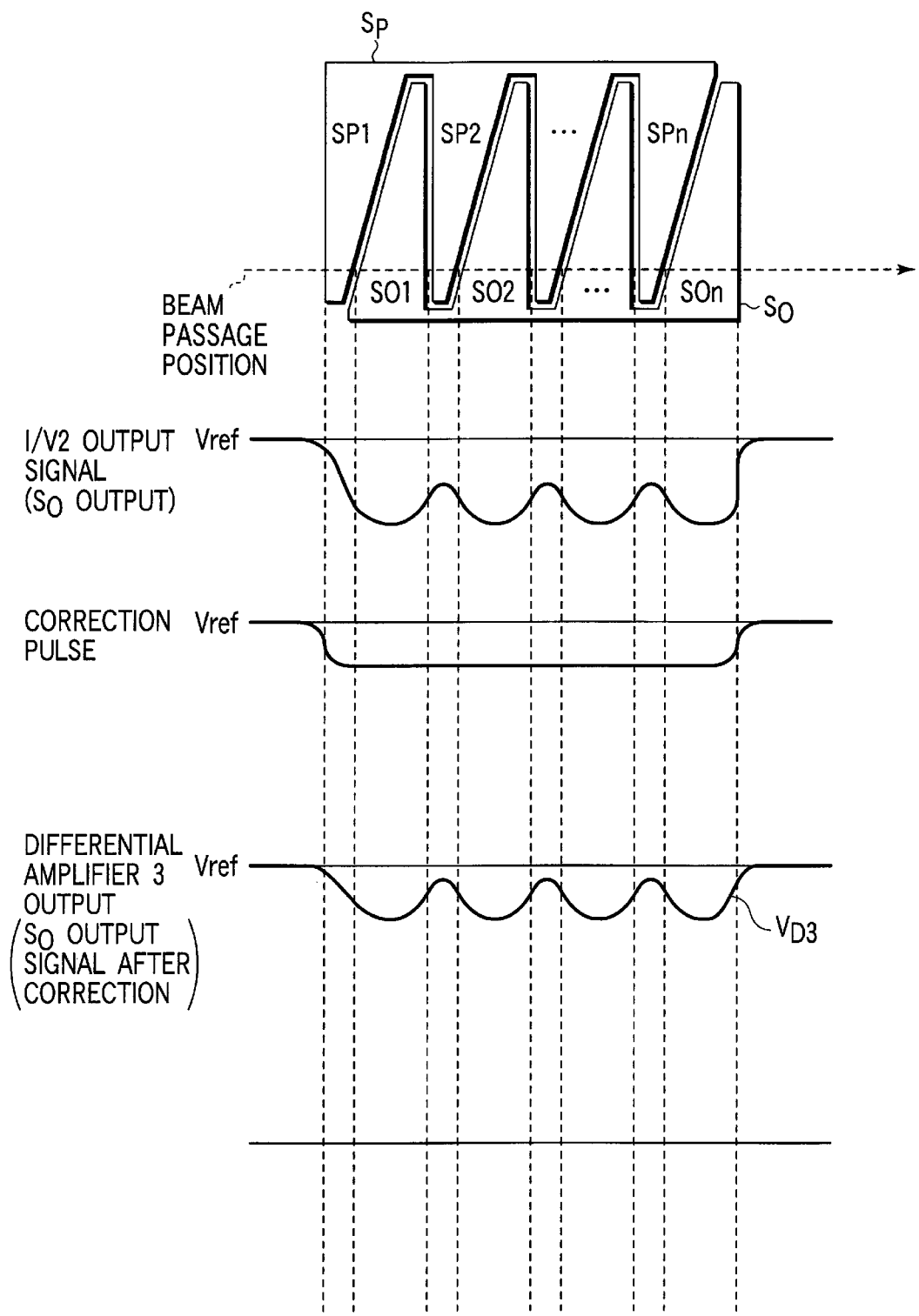
FIG. 17 shows a sensor pattern output, a differential amplifier output, and an integrator output according to a light beam passage position.

FIG. 17 shows how to correct an input signal to the integrator 62. In FIG. 17, a correction pulse is used for decreasing an output signal amplitude from the sensor pattern $S_O$. The correction pulse is removed from the sensor pattern $S_O$'s output signal. This decreases an output signal amplitude from the sensor pattern $S_O$. At this time, the CPU 51 controls a correction pulse amplitude.

Figure 18:
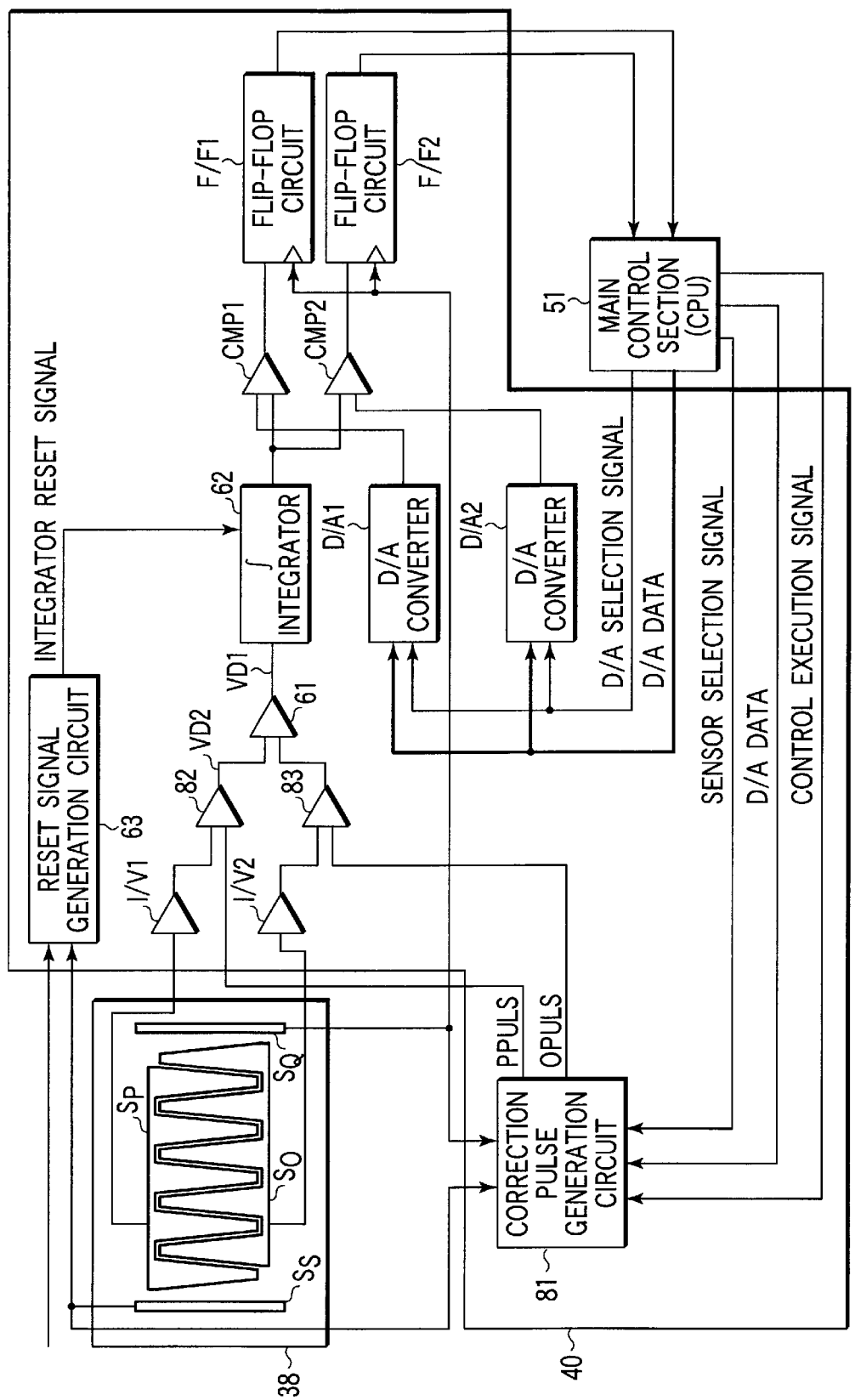
FIG. 18 is a block diagram of an output processing circuit in the beam detection apparatus.

Described below is a system which can implement the fourth embodiment. FIG. 18 is a block diagram of a light beam detection system capable of providing control indicated with the solid lines in FIG. 16 or control in FIG. 17.

FIG. 18 diagrams a circuit configuration in which the fourth embodiment is applied to the circuit configuration in FIG. 5.

A difference from the circuit configuration in FIG. 5 is that a correction pulse generation circuit 81, differential amplifiers 82 and 83, and a timing sensor $S_S$ are added in FIG. 18. The correction pulse generation circuit 81 generates a correction pulse. The differential amplifier 82 or 83 is provided between the current/voltage conversion amplifier (I/V1 or IV2) and the differential amplifier 61. The timing sensor $S_S$ takes timing for generating a correction pulse. The mutually corresponding parts in FIGS. 5 and 18 are designated by the same reference numerals and a detailed description is omitted for simplicity.

Here, as shown in FIGS. 16 and 17, operations of the circuits in FIG. 18 are explained assuming that a light beam passes below the center of a pair of sensor patterns $S_P$ and $S_O$.

When the correction pulse generation circuit 81 sets the correction pulse to the reference (no correction), a normal beam detection is performed like the circuit in FIG. 5. According to this beam detection, the main control section (CPU) 51 is supplied with an output signal from the integrator 62 via the comparators (CMP1 and CMP2) and the flip-flop circuits (F/F1 and F/F2). The CPU 51 determines necessity of the correction depending on whether an integrator 62's output signal approaches the power supply voltage (Vmax) or the ground level (Vmin).

When the correction is determined to be needed, the CPU 51 determines which of a pair of sensor patterns $S_P$ and $S_O$ requires an output correction. When an output signal from the integrator 62 approaches the power supply voltage (Vmax), the CPU 51 determines correction for the sensor pattern $S_P$'s output. When an output signal from the integrator 62 approaches the ground level (Vmin), the CPU 51 determines correction for the sensor pattern $S_O$'s output.

Namely, in the circuit of FIG. 18, the sensor pattern $S_P$'s output is corrected when the output signal from the integrator 62 approaches the power supply voltage (Vmax). The sensor pattern $S_O$'s output is corrected when the output signal from the integrator 62 approaches the ground level (Vmin).

In the cases of FIGS. 16 and 17, for example, the sensor pattern $S_O$'s output is corrected in the circuit of FIG. 18. At this time, the CPU 51 reads output signals of the flip-flop circuits (F/F1 and F/F2) and determines that the output signal approaches Vmin and that the sensor pattern $S_O$'s output needs to be corrected.

When determining correction of the sensor pattern $S_O$'s output, the CPU 51 issues a control execution signal and a sensor selection signal. The control execution signal indicates that the correction control is applied to the correction pulse generation circuit 81. The sensor selection signal indicates an object to be corrected, namely the sensor pattern $S_O$'s output to be corrected.

The CPU 15 sends D/A data indicating a correction pulse amplitude to the correction pulse generation circuit 81. A predefined data value is used for a value (D/A value) indicated by this D/A data. It may be preferable to settle the value indicated by the D/A data by gradually adjusting a given initial value.

The correction pulse generation circuit 81 is designed to supply a correction pulse to only outputs from the sensor pattern $S_O$ based on an instruction from the CPU 51. A correction pulse signal for sensor pattern $S_P$ outputs is set to the reference voltage. Accordingly, no correction is performed for outputs from the sensor pattern $S_P$.

After the above setup, the circuit in FIG. 18 performs correction when a light beam passes the sensor. When the light beam passes the sensor $S_S$, the correction pulse generation circuit 81 generates the correction pulse (OPULS) as shown in FIG. 17. The generated correction pulse (OPULS) is input to the differential amplifier 83. The sensor patterns $S_P$ and $S_O$ generate current outputs when the light beam passes. These current outputs from the sensor patterns $S_P$ and $S_O$ are converted to voltage signals by the current/voltage conversion amplifiers (I/V1 and I/V2), and then are input to the differential amplifiers 82 and 83.

The differential amplifier 83 computes a difference between an output voltage from the current/voltage conversion amplifier (I/V2) for the sensor $S_O$ and a correction voltage as the correction pulse (OPULS) transmitted from the correction pulse generation circuit 81. The obtained difference becomes a voltage output $V_{D3}$.

The differential amplifier 82 computes a difference between an output voltage from the current/voltage conversion amplifier (I/V1) for the sensor $S_P$ and the reference voltage (PPULS) transmitted from the correction pulse generation circuit 81. The obtained difference becomes a voltage output $V_{D2}$. When a gain of the differential amplifier 82 is set once (x1), the $V_{D2}$ equals an output voltage of the current/voltage converter (I/V1).

The differential amplifier 81 then computes a difference between the $V_{D2}$ and the $V_{D3}$. The computation result is input to the integrator 62 as an output voltage. The integrator 62 integrates the output voltage from the differential amplifier 81. The window comparator, the A/D converter, the flip-flop circuit, and the like operate the same as described in FIG. 5 and a detailed description is omitted here for simplicity.

Similarly, when the light beam passage position is above the sensor's center position, the CPU 51 allows the correction pulse generation circuit 81 to correct only outputs from the sensor pattern $S_P$. The correction pulse (PPULS) becomes a correction voltage as a correction value. The correction pulse (OPULS) functions as a reference voltage without correction. Consequently, only an output signal from the sensor pattern $S_P$ is corrected.

As mentioned above, a correction pulse is used for control based on a correction value determined by the CPU so that an integrator output is not saturated. This makes it possible to normally generate an output signal indicating the light beam detection position without saturating an integrator output even if the current/voltage conversion amplifier's amplification factor is increased or the integrator's integration constant is sensitized.

The correction pulse generation circuit 81 is detailed below.

Figure 19:
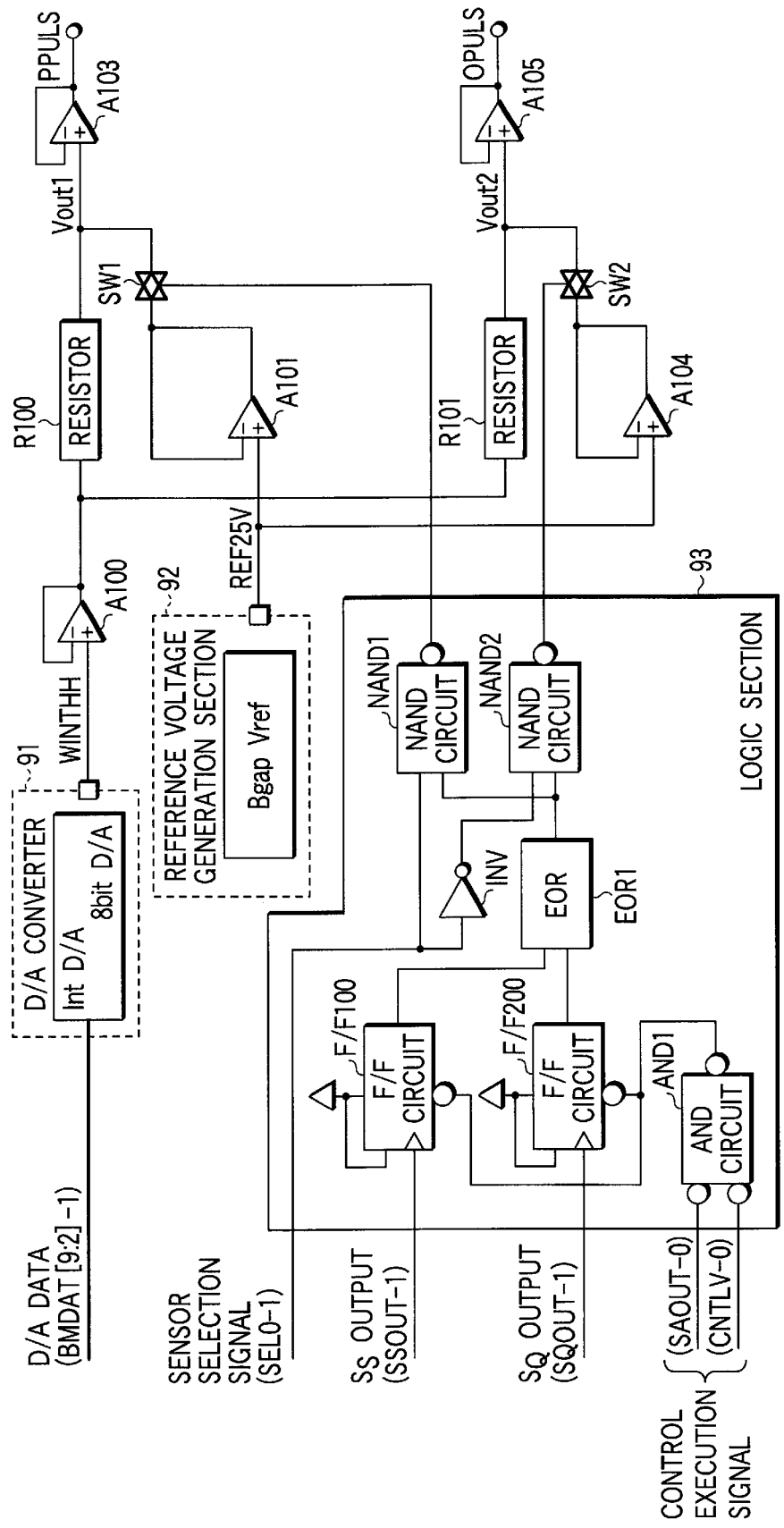
FIG. 19 shows a schematic configuration of a correction pulse generation circuit.

FIG. 19 shows a configuration example of the correction pulse generation circuit 81. This circuit comprises a D/A converter 91, a reference voltage generation section 92, a logic section 93, resistors (R100, R101), operational amplifiers (A100, A101, A103, A104), analog switches (SW1, SW2), and the like.

The D/A converter 91 adjusts a correction pulse amplitude. Based on D/A data supplied from the CPU 51, the D/A converter 91 generates an analog voltage and supplies it to the operational amplifier A100. The D/A data is digital data indicating an analog voltage to be generated.

The reference voltage generation section 92 generates and outputs a reference voltage in the correction pulse generation circuit 81. Since the example in FIG. 19 is a single power supply system of 0 to 5V, the reference voltage generation section generates the 2.5V reference voltage and supplies it to the succeeding stages.

The operational amplifiers (A100, A101, A103, A104) and the analog switches (SW1, SW2) generate correction pulses based on signals from the respective sections.

The logic circuit 93 comprises an AND circuit (AND1), flip-flop circuits (F/F100, F/F200), an exclusive OR circuit (EOR1), NAND circuits (NAND1, NAND2), and the like.

Based on a sensor selection signal (SELO-1) from the CPU 51, the logic section 93 selects a sensor to be corrected. Based on execution signals (SAOUT-0, CNTLV-1) from the CPU 51, the logic section 93 determines whether to perform correction. Further, the logic section 93 toggles between analog switches SW1 and SW2 according to timings of a sensor $S_S$ output (SSOUT-1) and a sensor $S_Q$ output (SQOUT-1).

Described below are operations of the correction pulse generation circuit 81.

First described is a portion comprising the D/A converter 91, the operational amplifiers A100, A101, A103, the analog switch (SW1), the resistor (R100), and the reference voltage generation section 92. The circuit comprising these parts is a sensor pattern $S_O$'s correction pulse generation section which generates the correction pulse (PPULS) for correcting sensor pattern $S_P$ outputs.

The D/A converter 91 generates an analog voltage (WINTHH) based on the D/A data supplied from the CPU 51. The analog voltage generated from the D/A converter 91 is input to a noninverting terminal of the operational amplifier A100. The analog voltage generated from the D/A converter 91 adjusts a correction pulse amplitude.

The operational amplifier A100 is a voltage follower. Accordingly, an output of the D/A converter 91 is output from the operational amplifier A100 as is. The reference voltage generation section 92 supplies 2.5V which is the reference voltage for the correction pulse generation circuit 81. This output (reference voltage) is supplied to a noninverting input terminal of the operational amplifier A101.

When the analog switch SW1 goes OPEN, an output of the operational amplifier A100 is output as the correction pulse (PPULS) for correcting sensor $S_P$ outputs via a voltage follower of the operational amplifier A103. Accordingly, when the analog switch SW1 goes OPEN, an analog voltage is output as the correction pulse (PPULS) from the D/A converter 91 based on D/A data supplied from the CPU 51.

When the analog switch SW1 goes CLOSE, the operational amplifier A101 functions so that the operational amplifier A101's inverting input terminal generates an electric potential of 2.5V. Accordingly, the A103's non-inverting input terminal also becomes 2.5V. The operational amplifier A103's voltage follower outputs 2.5V as PPULS. When the analog switch SW1 goes CLOSE, an output of the reference voltage generation section 92 is generated as PPULS from the A103.

By turning on or off the analog switch SW1 at a given timing, the PPULS can be selected as a reference voltage generation section 92's output (reference voltage) or a D/A converter 91's output (analog voltage based on D/A data).

The portion comprising the D/A converter 91, the operational amplifier A100, A101, A103, the analog switch (SW1), the resistor (R100), and the reference voltage generation section 92 functions as a sensor pattern $S_O$'s correction pulse generation section. This is a circuit which generates a correction pulse (OPULS) for correcting sensor pattern $S_O$ outputs.

Like the sensor $S_P$'s correction pulse generation section, this sensor pattern $S_O$'s correction pulse generation section also uses the operational amplifier A104 and the operational amplifier A105 to generate the correction pulse (OPULS). Namely, the operational amplifier A104 and the operational amplifier A105 operate like the operational amplifier A101 and the operational amplifier A103. Accordingly, by turning on or off the analog switch SW2 at a given timing, the OPULS can be selected as a reference voltage generation section 92's output (reference voltage) or a D/A converter 91's output (analog voltage based on D/A data).

The analog switch turns on or off depending on timings at which the sensor selection signal, the sensor $S_S$, and the sensor $S_Q$ occur.

When a sensor pattern $S_O$'s output is corrected, the sensor selection signal (SELO-1) goes "1". This sets one input of the NAND circuit (NAND1) to "1" and one input of the NAND circuit (NAND2) to "0". Accordingly, an output of the NAND circuit (NAND1) depends on an EOR1 output. An output of the NAND circuit (NANDL) always goes 1 independently of the EOR1 output.

An output of the NAND circuit (NAND1) turns on or off the analog switch SW1 at output timings of the sensors $S_S$ and $S_Q$. The analog switch SW2 always maintains the ON (CLOSE) state according to an output of the NAND circuit (NAND2). The PPUL, as an output signal of the operational amplifier A103, becomes a pulse signal at the timing output from the sensors $S_S$ and $S_Q$. The OPULS, as an output signal of the operational amplifier A105, becomes an output voltage of the reference voltage generation section 92, namely 2.5V.

The above-mentioned configuration makes it possible to generate any pulse signal during a period between the sensor $S_S$'s output timing and the sensor $S_Q$'s output timing.

Figure 20:
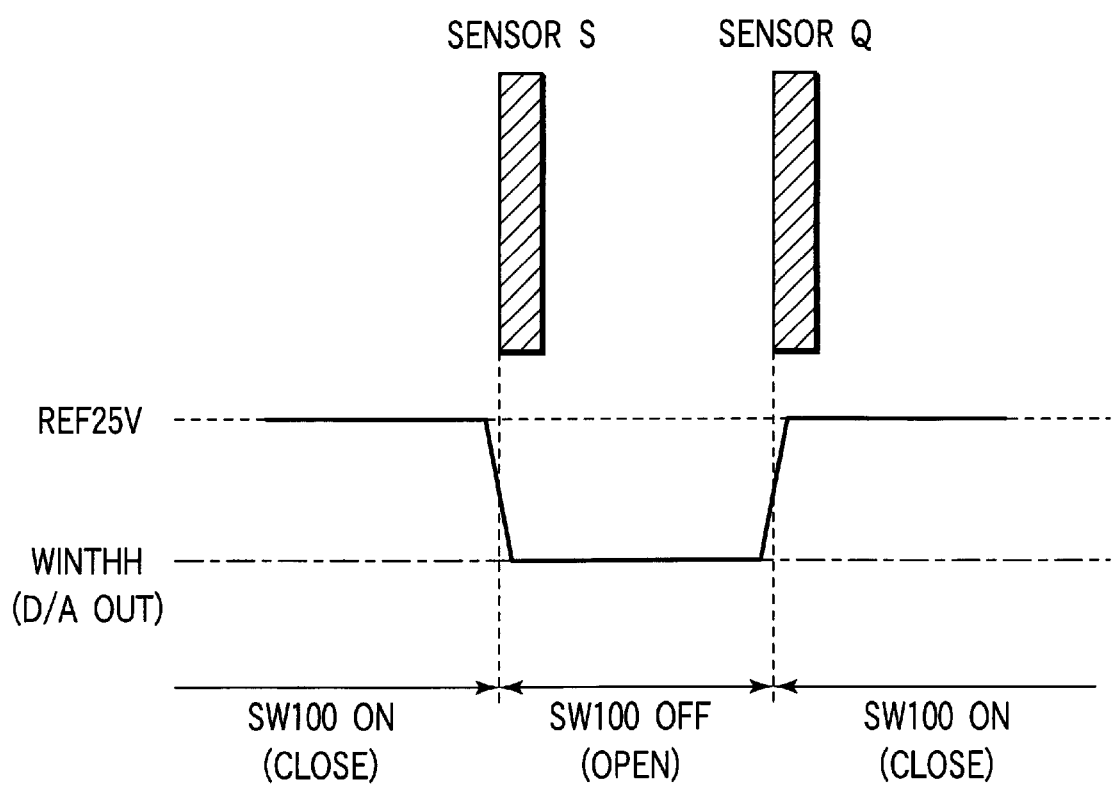
FIG. 20 shows relationship between a timing sensor and a correction pulse.

FIG. 20 shows the PPULS as an output signal of the operational amplifier A103. In this figure, the sensor $S_S$ output timing turns off the analog switch SW1. The PPULS changes from the reference voltage to the WINTHH. The sensor $S_Q$ output timing turns on the analog switch SW1. The PPULS changes from the WINTHH to the reference voltage.

Figure 21:
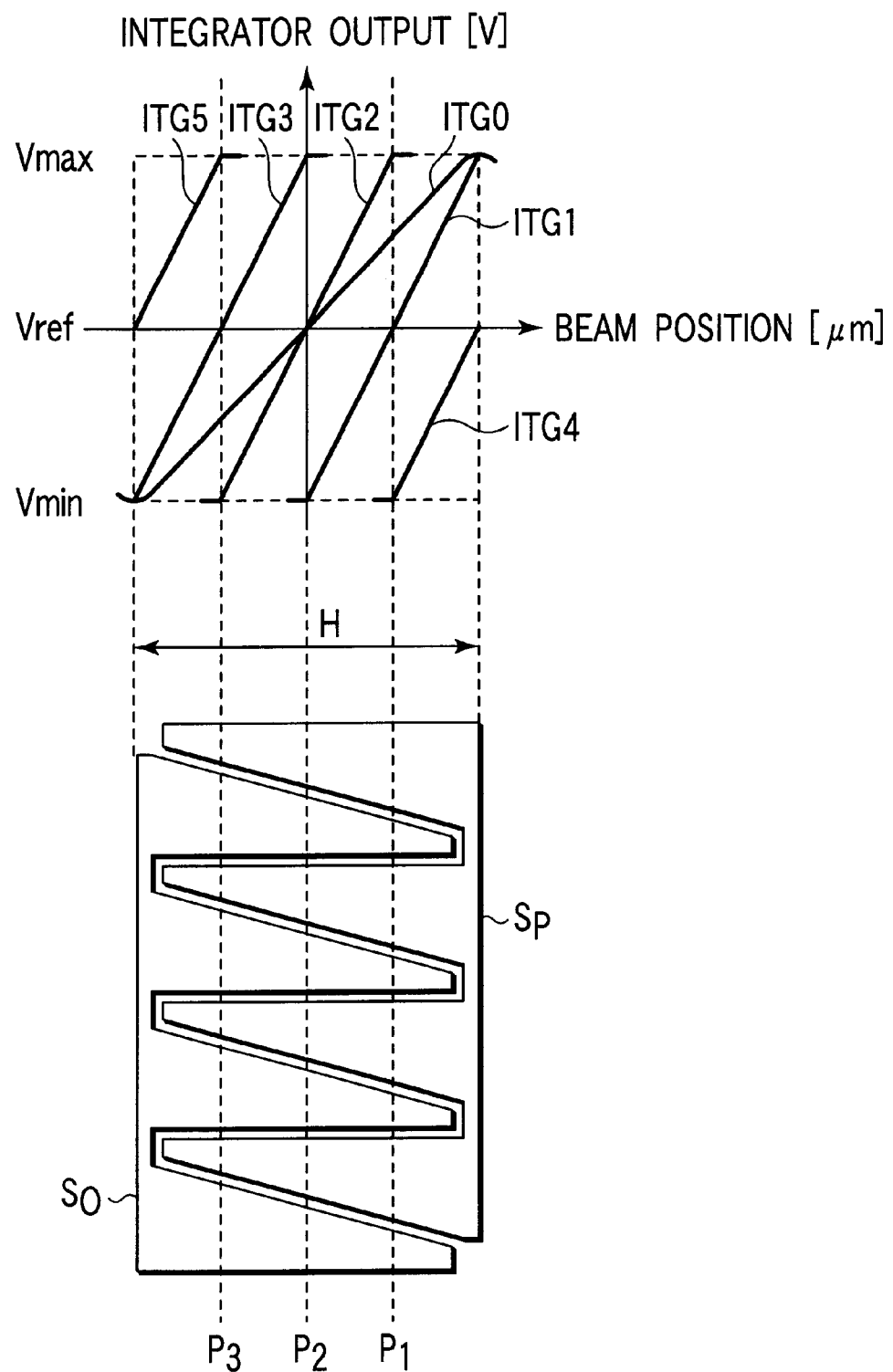
FIG. 21 shows relationship between a light beam passage position and an integration output.

FIG. 21 shows relationship between an integrator 62's output and the light beam passage position when the correction as described in the fourth embodiment is performed. As seen from this figure, an integrator 62's output is almost saturated at the light beam passage positions $P_1$ and $P_3$. When the light beam passes above (outside) the passage position $P_1$ or below (outside) the passage position $P_3$, the light beam passage position cannot be detected.

When a light beam passes the passage position $P_3$, the integrator 62's output becomes ITG2 without correction. The integrator 62's output becomes Vmin and approaches the saturation region. In this case, an ITG3's output can be obtained by correcting the sensor pattern $S_O$'s output and adjusting a D/A data value so that the integrator output approximates Vref. The ITG3 can detect a range of ±H/4 from the passage position $P_3$ used as the center.

Similarly, when a light beam passes the passage position $P_1$, correction is applied to the sensor pattern $S_P$ side. Also in this case, an ITG1 output can be obtained by adjusting a D/A data value so that the integrator output approximates Vref. The ITG1 can detect a range of ±H/4 from the passage position $P_1$ used as the center.

It may be preferable to predetermine the relationship between a D/A data value and the beam detection characteristic. According to the beam detection characteristic (integrator's output graph) as shown in FIG. 21, D/A data values are predetermined for providing detection characteristics of ITG1, ITG2, ITG3, ITG4, and ITG5. It is possible to detect light beam passage positions all over the sensor regions by using these five D/A data values and corresponding beam detection characteristics (integration characteristics). Predetermining D/A data values simplifies adjustment of these values and makes the management easy.

Described below are control operations of the main control section (CPU) 51 in the thus configured circuit.

Figure 22:
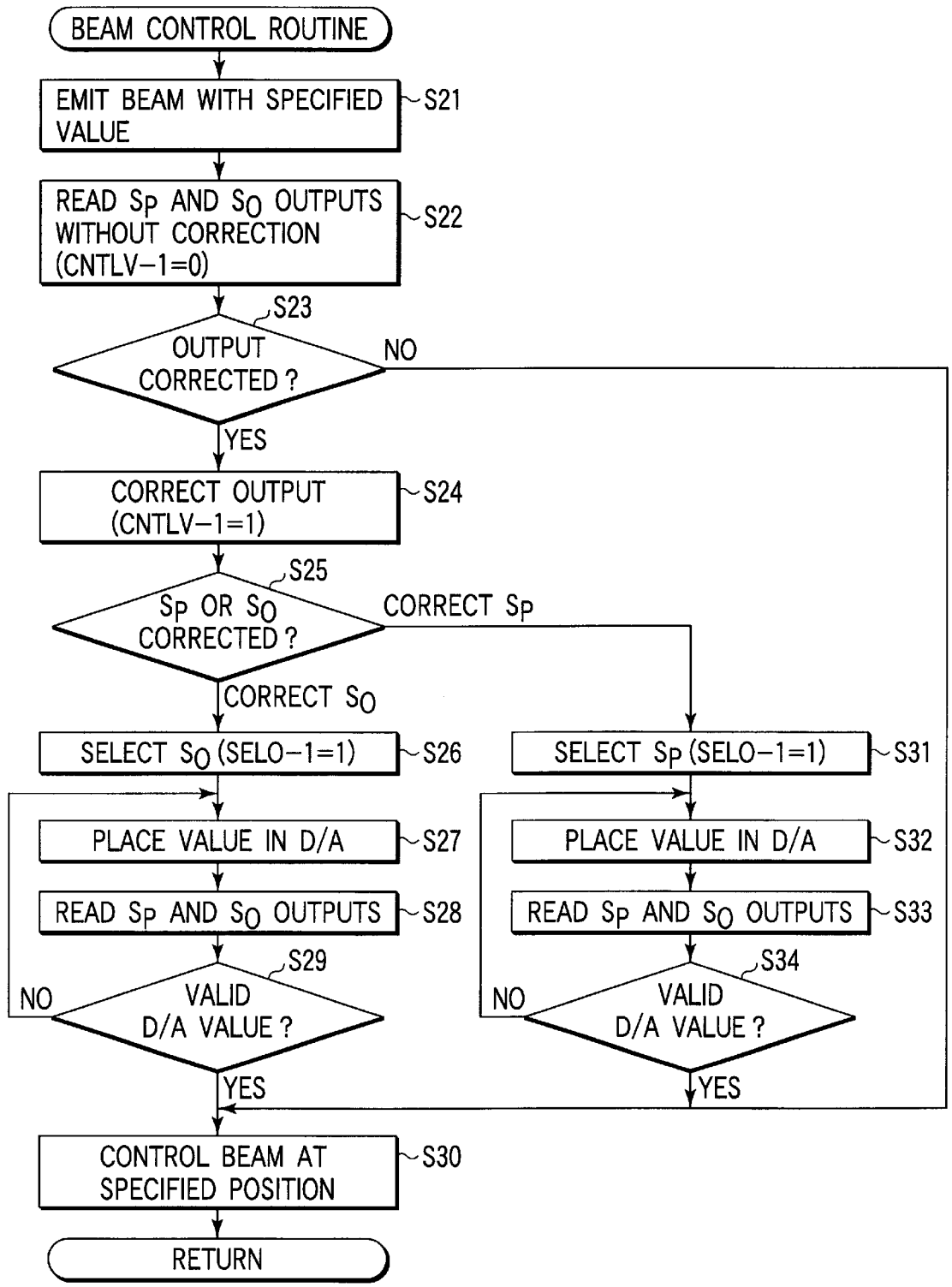
FIG. 22 is a flowchart showing a light beam control routine.

FIG. 22 a flowchart for explaining CPU 51's control operations.

The CPU 51 first generates a light beam with a specified value (step S21). When the light beam is generated, the CPU 51 reads an output signal from the sensor patterns $S_P$ and $S_O$ without correction (step S22). At this time, the CPU 51 sets the control execution signal (CNTLV-1) to "0" for operating the circuit without correction.

When reading output signals from sensor patterns $S_P$ and $S_O$, the CPU 51 determines the necessity of correction based on output signal values. When it is determined that the correction is needed (YES at step S23), the CPU 51 sets the control execution signal (CNTLV-1) to "1" (step S24). Based on the read data, the CPU 51 determines whether to correct the sensor pattern $S_P$'s output or the sensor pattern $S_O$'s output (step S25).

When the sensor pattern $S_O$'s output is determined to be corrected, the CPU 51 sets SEL0-1 to "1" which is a sensor selection signal to be corrected (step S26). The CPU 51 sets a D/A data value according to an output signal value of the sensor pattern $S_O$ (step S27). At this time, the CPU 51 sets predefined D/A data values, say, for ITG1 to ITG5 as shown in FIG. 21.

After supplying these signals to the correction pulse generation circuit 81, the CPU 51 rereads output signals from the sensor patterns $S_P$ and $S_O$ (step S28). According to the read values for the sensor patterns $S_O$ and $S_P$, the CPU 51 checks if the D/A data values are set correctly (step S29). When it is determined that the D/A data values are incorrect, the CPU 51 returns to step S27 to reset the D/A data values. When it is determined that the D/A data values are proper (YES at step S29) or that no correction is performed (NO at step 23), the CPU 51 determines the detection result about the light beam position. Based on this determination, the CPU 51 controls the light beam to a specified position (step S30).

When it is determined that the sensor pattern $S_P$'s output is corrected at step S23, the CPU 51 sets SEL0-1 TO "0" which is a sensor selection signal indicating an object to be corrected (step S31). According to the sensor pattern $S_P$'s output signal value, the CPU 51 sets the D/A data value (step S32). At this time, the CPU 51 sets predefined D/A data values, say, for ITG1 to ITG5 as shown in FIG. 21.

After supplying these signals to the correction pulse generation circuit 81, the CPU 51 rereads output signals from the sensor patterns $S_P$ and $S_O$ (step S33). According to the read values for the sensor patterns $S_O$ and $S_P$, the CPU 51 checks if the D/A data values are set correctly (step S34). When it is determined that the D/A data values are incorrect, the CPU 51 returns to step S32 to reset the D/A data values. When it is determined that the D/A data values are proper (YES at step S34), the CPU 51 determines the detection result about the light beam position. Based on this determination, the CPU 51 controls the light beam to a specified position (step S30).

As mentioned above, the fourth embodiment enables detection of a light beam in almost all regions of the sensor patterns $S_O$ and $S_P$. In addition, it is possible to improve the detection accuracy compared to the beam position detection characteristic without correction of outputs from the sensor patterns $S_O$ and $S_P$ as described in the first, second, and third embodiments.

There may be the need for increasing the current/voltage conversion amplifier's gain or further sensitizing the integrators integration constant RC. In these cases, the fourth embodiment can detect a light beam position by adjusting the correction pulse size (D/A data value) accordingly. Consequently, this makes it possible to improve the light beam detection accuracy.

In the example of FIG. 21, it is assumed that the beam position detection characteristic is ITG0 when no correction is performed for outputs from the sensor patterns $S_O$ and $S_P$ like the first, second, and third embodiments. By contrast, the fourth embodiment can provide beam position detection characteristics as indicated with ITG1 to ITG5 by using a correction pulse for correction. Accordingly, the fourth embodiment can approximately double the beam position detection characteristic compared to ITG0.

Described below is the fifth embodiment.

Like the fourth embodiment, the fifth embodiment is applied to a light beam apparatus having a multi-beam optical system which scans the light beam detection apparatus having the correction function by using a plurality of, say, four light beams Accordingly, the principle of detecting and controlling light beam passage positions is already described in the first and fourth embodiments and a detailed description is omitted. The multi-beam optical system configuration is omitted because it is already explained in FIG. 2.

Figure 23:
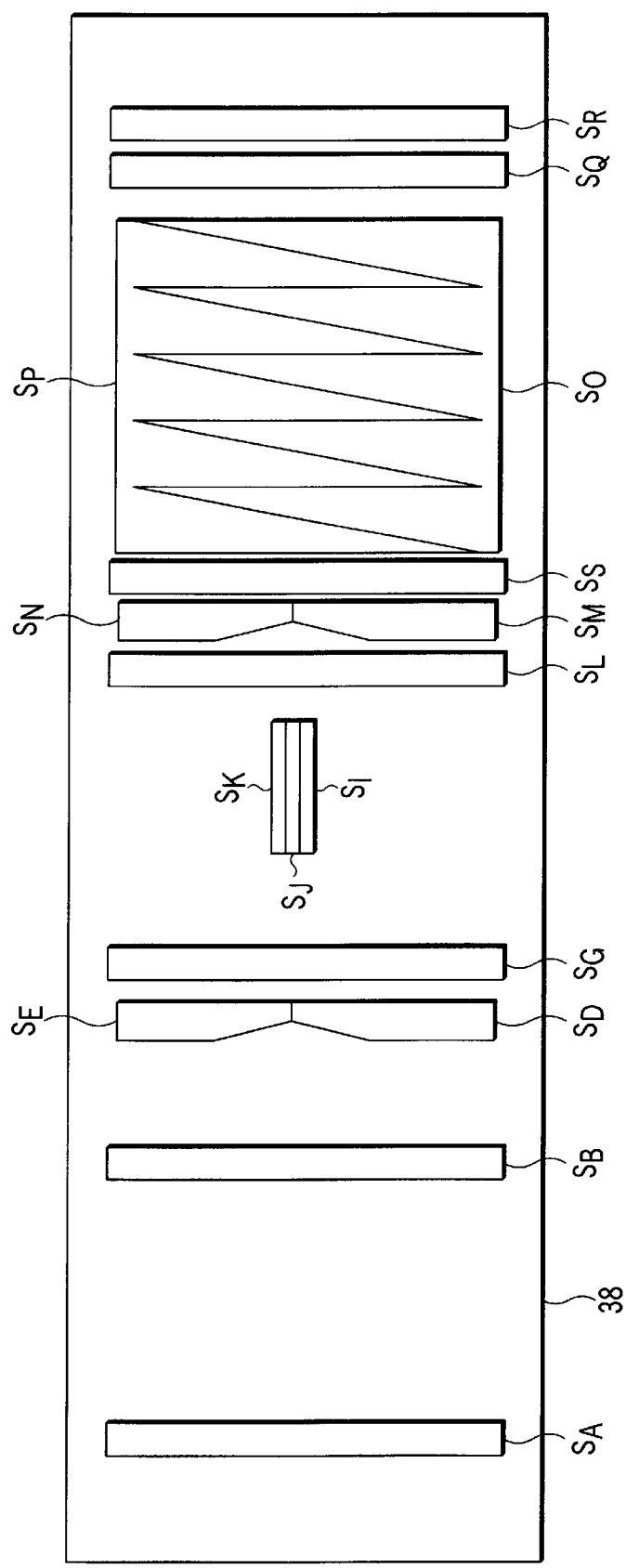
FIG. 23 shows a schematic configuration of the beam detection apparatus.

FIG. 23 shows a configuration of the light beam detection apparatus 38 to which the fifth embodiment is applied. A difference between FIGS. 23 and 8 is that a timing sensor $S_S$ is added in FIG. 23 for generating a correction pulse. Except the timing sensor $S_S$, the mutually corresponding parts in FIGS. 8 and 23 are designated by the same reference numerals.

Described below is the multi-beam passage position control using the light beam detection apparatus 38 in FIG. 23. The following description assumes a 4-beam multi-beam optical system having four laser oscillators and four actuators (galvanomirrors in this example) for moving respective light beams in the vertical scan direction. This multi-beam optical system is assumed to provide the 600 dpi resolution.

As mentioned in the fourth embodiment, the light beam detection apparatus 38 has the detection characteristic as shown in FIG. 21. When the sensor's effective detection region is assumed to be H[μm] in FIG. 21, a voltage value equivalent to 1[μm] is $(|Vmax-Vmin|)/(H/2)=Vunit[V/\mu m]$. In FIG. 21, ITG1 to ITG5 as output integrator's output characteristics should have voltage values equivalent to $(|Vmax-Vmin|)/(H/2)=V$ unit$[V/\mu m]$ per 1[μm]. In order to provide a pitch of 600 dpi=42.3 μm for a plurality of beams, galvanomirrors should be adjusted so that an integration output difference between beams becomes Vinit×42.3[V].

To set a passage target position of the first light beam to P2, for example, the first laser oscillator is activated to rotate a polygon mirror. Then, the galvanomirror for the first light beam is operated so that the light beam can pass within the sensor pattern. After the light beam successfully passes within the sensor pattern, the galvanomirror is used to adjust the first light beam passage position so that the integration output becomes Vref.

Then, the second light beam passage position is adjusted. The second laser oscillator is activated to rotate a polygon mirror. Like the first light beam, the galvanomirror for the second light beam is operated so that the light beam can pass within the sensor pattern. Thereafter, the galvanomirror for the second light beam is used to adjust the second light beam passage position so that the integrator output becomes Vref−Vunit×42.3[v].

These operations control and provide a pitch of 42.3[μm] between the first and second light beam passage positions. A similar operation is used for the third and fourth light beams. Namely, the galvanomirror for the third or fourth light beam is adjusted so that a difference between integration outputs of adjacent light beams becomes Vunit×42.3[V] equivalent to 42.3[μm].

The above operations provide control to maintain a pitch of 42.3[μm] between four light beam passage positions. Thus, it is possible to control four light beam passage positions to a specified pitch.

Described below is the sixth embodiment of the present invention.

Like the fifth embodiment, the sixth embodiment is applied to a light beam scanning apparatus having a multi-beam optical system. A difference between the fifth and sixth embodiments is that at least one of a plurality of light beams is fixed in the sixth embodiment. Accordingly, the sixth embodiment uses the fixed light beam passage position as a reference and controls the remaining light beam passage positions to a specified pitch (relative position control).

Figure 24:
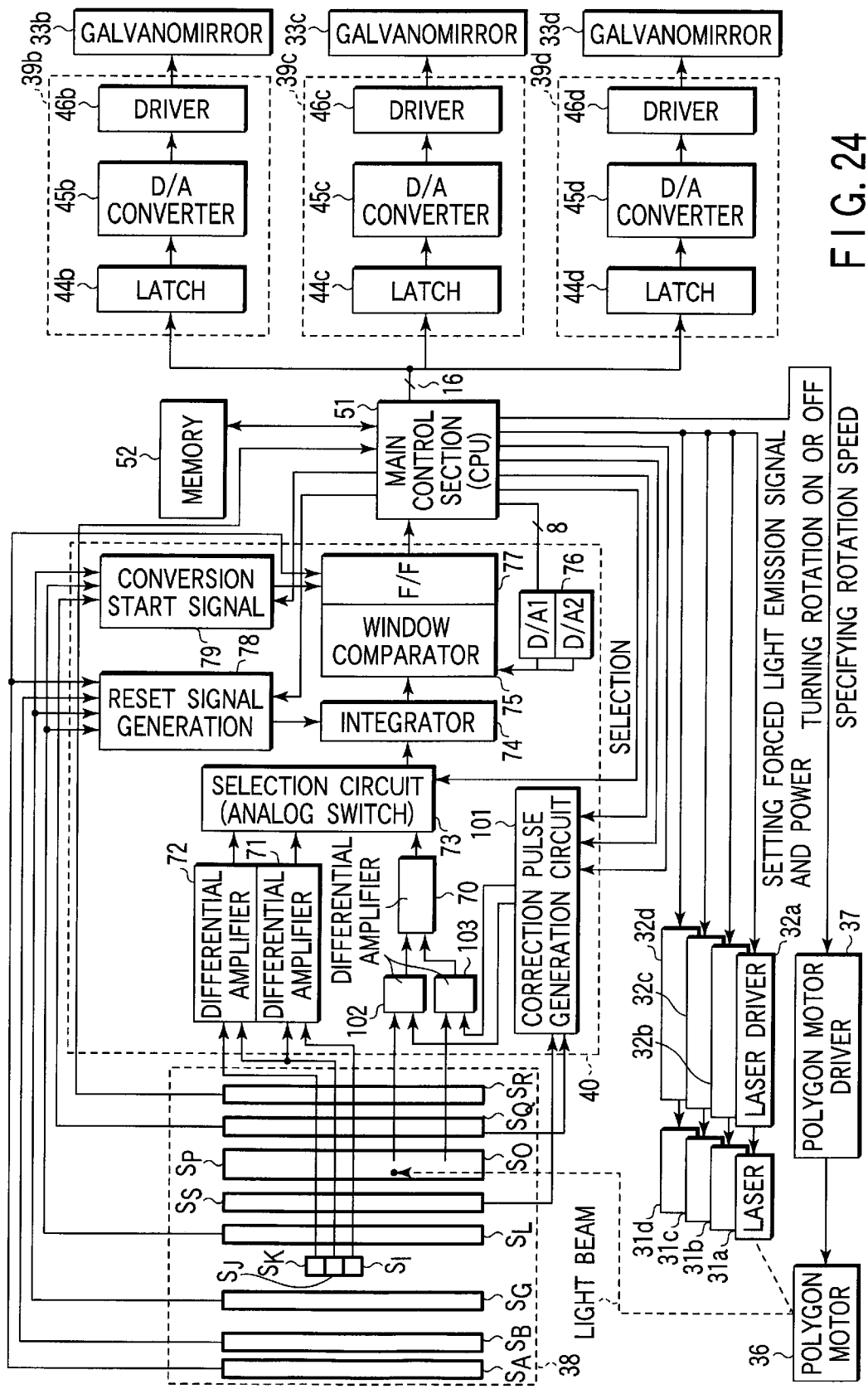
FIG. 24 is a block diagram of the optical control system.

FIG. 24 is a block diagram of a circuit system according to the sixth embodiment.

A difference between the circuits in FIGS. 24 and 12 is that The circuit in FIG. 24 differs from that in FIG. 12 in that differential amplifiers 102 and 103 are added before the differential amplifier 61. Further, there are added a timing sensor $S_S$ and a correction pulse generation circuit 101 for generating a correction pulse. Except these differences, the configuration is same as that in FIG. 12. Therefore, the same parts or components are depicted by the same reference numerals and a detailed description is omitted for simplicity. The correction pulse generation circuit 101 and the differential amplifiers 102 and 103 operate the same as the correction pulse generation circuit 81 and the differential amplifiers 82 and 83 described in the fifth embodiment.

In the circuit of FIG. 24, the correction pulse generation circuit 101 connects with the main control section 51 and the timing sensors $S_S$ and $S_Q$. The differential amplifiers 102 and 103 connect with the sensor patterns $S_O$ and $S_P$, respectively.

In the circuit of FIG. 24, an output of the integrator 74 is input to the main control section 51 based on the light beam position according to the same operation as in FIG. 12. Based on the integrator 74's output, the main control section 51 determines the necessity of correction. When determining the necessity of correction, the main control section 51 selects a sensor pattern to be corrected and sets D/A data for indicating the correction pulse value as a correction amount. At this time, the main control section 51 outputs a control execution signal indicating that the correction control is performed, a sensor selection signal indicating the sensor pattern to be corrected, and D/A data indicating the correction pulse value to the correction pulse generation circuit 101. The main control section 51 sends a control signal to the selection circuit 73 for selecting the differential amplifier 70.

The correction pulse generation circuit 101 sets a correction pulse with a voltage value indicated by D/A data. This data is contained in the differential amplifier 102 (or 103) connected to the sensor pattern $S_O$ (or $S_P$) selected by the sensor selection signal from the main control section 51. A correction pulse is set to the reference voltage for the differential amplifier 103 (or 102) connected to sensor pattern $S_P$ (or $S_O$) not selected by the sensor selection signal. The correction pulse is supplied to the differential amplifiers 102 and 103 at the timing when the timing sensor $S_S$ detects a light beam.

When supplied with the correction pulses, the differential amplifiers 102 and 103 provide the differential amplifier 70 with a difference between the correction pulse and the sensor pattern $S_O$ or $S_P$ whose output signal is input to either of the differential amplifiers. According to this operation, the differential amplifier 70 is supplied with output signals from the sensor patterns $S_O$ and $S_P$. At this time, these output signals are corrected with the value set by the main control section 51.

Detailed operations of the sixth embodiment are described with reference to FIGS. 25 and 26.

Figure 25:
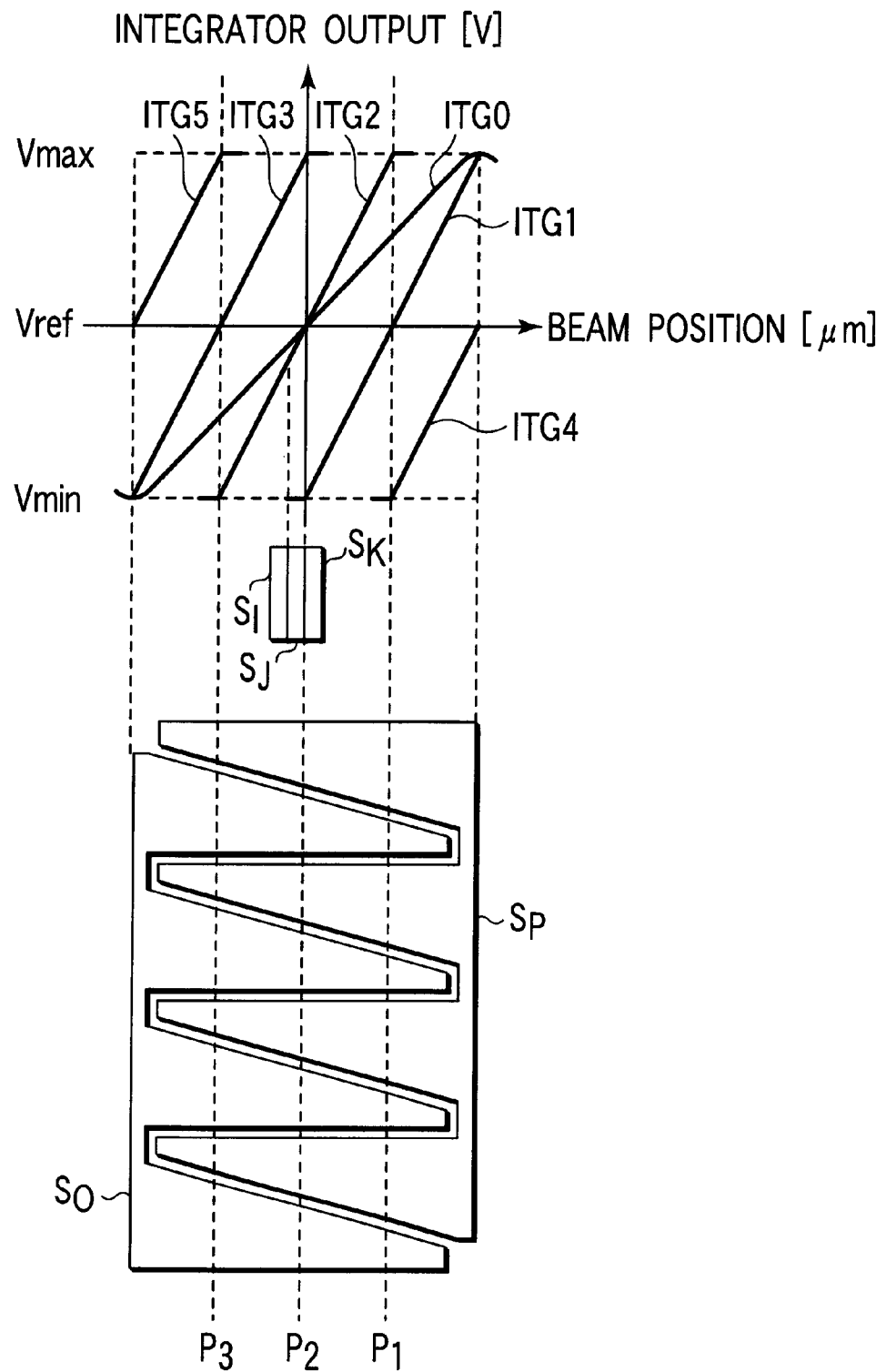
FIG. 25 shows relationship between a light beam passage position and an integration output.
Figure 26:
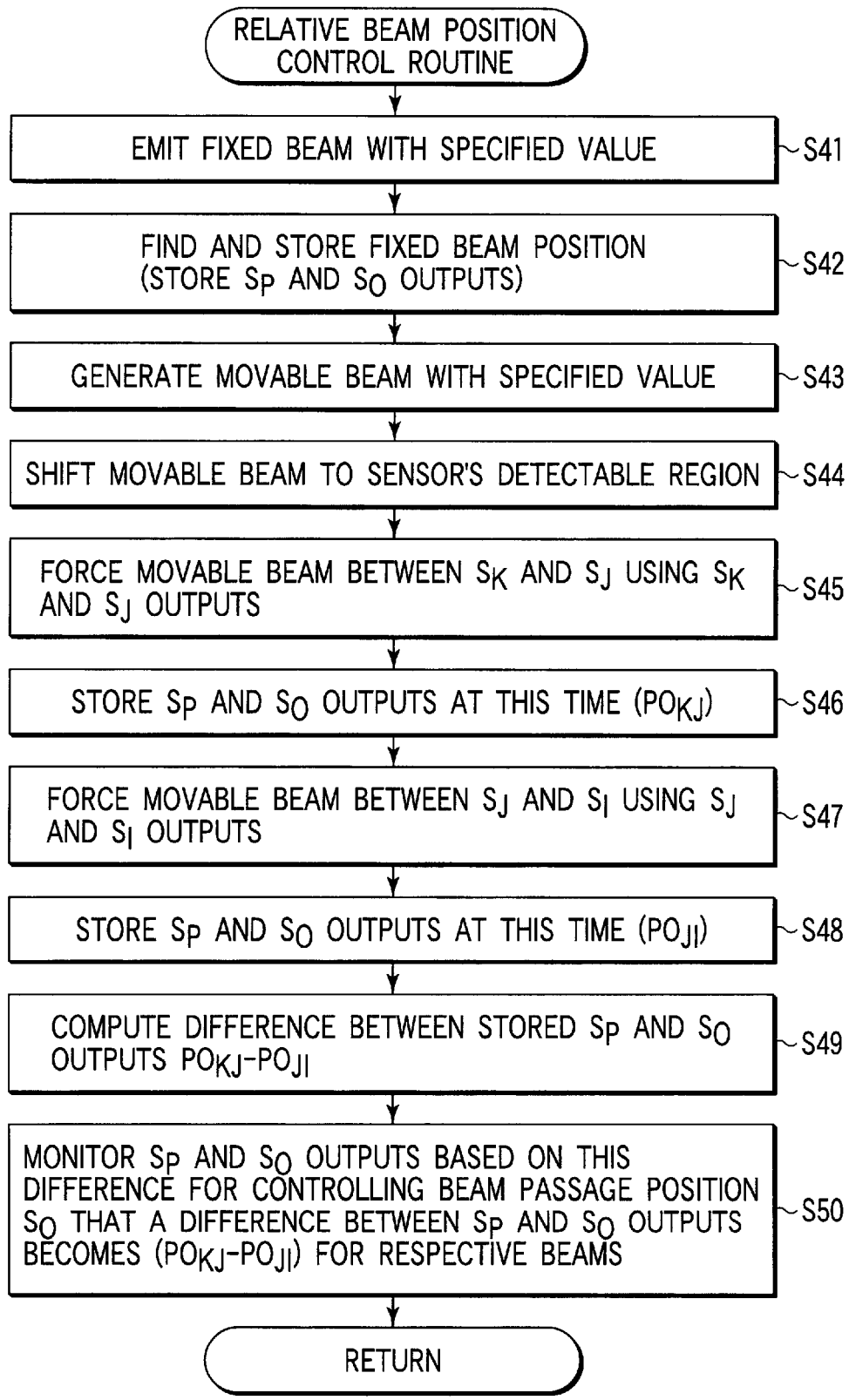
FIG. 26 is a flowchart showing a relative beam position control routine.

FIG. 25 shows relationship between a light beam passage position and an integration output on the sensor patterns $S_P$ and $S_O$. Integrator outputs based on outputs from the sensor patterns $S_P$ and $S_O$ have characteristics ITG1 to ITG5 according to D/A values of the correction pulse generation section 81. It should be noted that the ITG2 is an integration output (beam detection characteristic) when no correction is performed.

Described below is the relative position control of light beams in the multi-beam optical system according to the sixth embodiment with reference to the flowchart in FIG. 26. The flowchart in FIG. 26 shows operations of the circuit as configured in FIG. 24.

First, the CPU 51 generates a fixed laser beam with a specified value (step S41). For example, the main control section 51 sends a specified value to the first laser driver 32a to generate the first laser oscillator 31a with a specified power. By doing so, the main control section 51 outputs the first light beam. It is assumed that the polygon mirror already rotates.

The main control section 51 then selects a D/A data value as the correction value and sends the D/A data to the correction pulse generation circuit 101. When P1 is assumed to be a position where a fixed beam passes in FIG. 25, for example, the CPU 51 sets the D/A value so that the ITG1 characteristic is selected. The main control section 51 then sends the specified D/A value as D/A data to the correction pulse generation circuit 101.

Concurrently, the main control section 51 sends a selection signal to the selection circuit 73. for selecting the differential amplifier 70. By doing so, the main control section 51 sends a differential output between the sensor patterns $S_P$ and $S_O$ to the integrator 74.

Likewise, the main control section 51 sends a sensor selection signal to the reset signal generation circuit 78 and conversion start signal circuit 79. By doing so, the main control section 51 generates a reset signal and an analog/digital conversion start signal for integrating a differential signal between the sensor patterns $S_P$ and $S_O$. This step enables the main control section 51 to incorporate a differential output between the sensor patterns $S_P$ and $S_O$.

The light beam detection apparatus output processing circuit 40 outputs an output signal to the CPU 51 corresponding to the passage position of the fixed beam detected by the light beam detection apparatus 38 having the sensor patterns $S_O$ and $S_P$. The CPU 51 determines a detection characteristic based on the correction value determined by the D/A value supplied to the light beam detection apparatus output processing circuit 40. The CPU 51 detects the fixed beam's passage position based on the detection characteristic for the thus determined D/A value and the output signal from the light beam detection apparatus output processing circuit 40. The CPU 51 records the passage position of the detected fixed beam in the memory 52 (step S42).

When the D/A value to be the ITG1 characteristic is selected in FIG. 25, for example, the CPU 51 determines ITG1 to be the detection characteristic. The CPU 51 detects the fixed beam's passage position based on the thus determined ITG1 characteristic and the output signal from the light beam detection apparatus output processing circuit 40.

The following steps provide control so that the other three light beam passage positions maintain a specified pitch, say, a 42.3 μm pitch with reference to the first light beam passage position detected at this step S42.

The main control section 51 then generates a moveable second light beam with a specified power (step S43). For example, the main control section 51 sends a specified value to the second laser driver 32b to generate the second laser oscillator 31b with a specified power.

Likewise, the main control section 51 selects appropriate D/A data and monitors a differential output between the sensor pattern $S_P$ and $S_O$ according to the detection characteristic based on that D/A value. Accordingly, the main control section 51 can identify the second light beam passage position. The main control section 51 operates the galvanomirror 33b so that the second light beam can pass within a detection region of the sensor patterns $S_P$ and $S_O$ (step S44). Thereafter, the main control section 51 operates the galvanomirror 33b so that the second light beam passes near the center of the sensor patterns $S_P$ and $S_O$. It should be noted that high precision is not required for the light beam passage position adjustment at this step.

The main control section 51 controls the second light beam coarse adjusted at step S4 so that its passage position is centered on a gap between the sensors $S_K$ and $S_J$. The sensors $S_I$, $S_J$, and $S_K$ are approximately centered between the sensor patterns $S_P$ and $S_O$. Accordingly, the main control section 51 can center the light beam passage position on the gap between the sensors $S_K$ and $S_J$ without excessively varying that position and consuming time. Detailed below is processing at step S45.

The main control section 51 sends a selection signal to the selection circuit 73 for selecting the differential amplifier 71. Doing so supplies the integrator 74 with a differential output between the sensors $S_K$ and $S_J$. Likewise, the main control section 51 sends a sensor selection signal to the reset signal generation circuit 78 and the conversion start signal circuit 79. By doing so, the main control section 51 generates a reset signal for integrating a differential signal between the sensors $S_K$ and $S_J$ and an analog/digital conversion start signal. This setting enables the main control section 51 to incorporate the differential output between the sensors $S_K$ and $S_J$.

The main control section 51 then operates the galvanomirror 33b for the second light beam and provides control to center the second light beam passage position on the gap between the sensors $S_K$ and $S_J$. For operating the galvanomirror 33b, the main control section 51 first places a specified value in the D/A converter 45b. A signal analog-converted by the D/A converter 45b is input to the driver 46b which outputs a current corresponding to the D/A converted value to the galvanomirror 33b. The galvanomirror 33b operates according to an output current value of the driver 46b. Accordingly, the main control section 51 can change the second light beam passage position by modifying the specified value for the D/A converter 45b.

The main control section 51 re-reads a differential output between the sensor patterns $S_P$ and $S_O$ without changing the setting for the galvanomirror 33b at step S45. At this time, the main control section 51 selects no correction and detects a light beam position according to the ITG2 characteristic shown in FIG. 25. This is because the sensors $S_I$, $S_K$, and $S_J$ are approximately arranged at the center of the sensor patterns $S_P$ and $S_O$, eliminating the need for correction. When the light beam is centered on the gap between sensors $S_K$ and $S_J$ according to this position detection, the main control section 51 stores the output value ($PO_{KJ}$) of the processing circuit 40 in the memory 52 (step S46). The $PO_{KJ}$ value becomes the processing circuit 40's output value indicating that the light beam passage position is centered on the gap between sensors $S_K$ and $S_J$.

After the second light beam is centered on the gap between the sensors $S_K$ and $S_J$ at step S46, the main control section 51 then centers this light beam on the gap between the sensors $S_J$ and $S_I$ at step S47.

The main control section 51 sends a selection signal to the selection circuit 73 for selecting the differential amplifier 72. Doing so supplies the integrator 74 with a differential output between the sensors $S_J$ and $S_I$. Likewise, the main control section 51 sends a sensor selection signal to the reset signal generation circuit 78 and the conversion start signal circuit 79. By doing so, the main control section 51 generates a reset signal for integrating a differential signal between the sensors $S_J$ and $S_I$ and an analog/digital conversion start signal. This setting enables the main control section 51 to incorporate the differential output between the sensors $S_J$ and $S_I$.

The main control section 51 operates the galvanomirror 33b for the second light beam to center the second light beam passage position on the gap between the sensors $S_J$ and $S_I$ like step S45.

When the second light beam passes the center of the gap between the sensors $S_J$ and $S_I$, the main control section 51 re-reads a differential output between the sensors $S_P$ and $S_O$. At this time, the main control section 51 selects no correction as a D/A value and detects a light beam position according to the ITG2 characteristic shown in FIG. 25. This is because the sensors $S_I$, $S_K$, and $S_J$ are approximately arranged at the center of the sensor patterns $S_P$ and $S_O$, eliminating the need for correction. When the light beam is centered on the gap between sensors $S_J$ and $S_I$ according to this position detection, the main control section 51 stores the output value ($PO_{JI}$) of the processing circuit 40 in the memory 52 (step S48). The $PO_{JI}$ value becomes the processing circuit 40's output value indicating that the light beam passage position is centered on the gap between sensors $S_J$ and $S_I$.

Then, the main control section 51 operates a difference between the value $PO_{KJ}$ in the memory 52 stored at step S46 and the value $PO_{JI}$ in the memory 52 stored at step S48 (step S49). A pitch of 42.3 μm is provided between the center of sensors $S_K$ and $S_J$ and the center of sensors $S_J$ and $S_I$. When the light beam is moved from step S45 (step S46) to step S47 (step S48), the moving distance is equivalent to 42.3 μm. The difference between $PO_{KJ}$ and $PO_{JI}$ operated at this step S49 equals the difference between differential outputs from the sensor patterns $S_P$ and $S_O$ and is equivalent to the moving distance (42.3 μm) for the second light beam.

The sixth embodiment detects a light beam position by using a detection characteristic corresponding to the defined D/A data value. In order to implement a specified pitch (42.3 μm) as a relative distance between the first and second light beams, the position of the second light beam must be controlled based on the detection characteristic (ITG1) selected at step S42. Namely, by setting the D/A value selected at step S42, the second light beam is controlled so that its output becomes (the value stored in the memory 52 at step S42)—($PO_{KJ}-PO_{JI}$). This provides the specified pitch (42.3 μm) between the passage position of the fixed light beam (first light beam) and the passage position of the moveable light beam (second light beam). The processing at this step uses a differential output between the sensor patterns $S_P$ and $S_O$.

The passage position of the fixed light beam (first light beam) is detected at step S42 and is stored in the memory 52. The main control section 51 operates the galvanomirror 33b to control the second light beam's passage position so that the passage position of the moveable second light beam provides the 42.3 μm pitch with reference to the first light beam.

Namely, the main control section first provides the processing circuit 40 with the D/A value similar to step S42 for generating the second light beam. The main control section 51 then changes the second light beam passage position so that the processing circuit 40's output value indicating the second light beam passage position matches a value obtained by subtracting the value ($PO_{KJ}-PO_{JI}$) found at step S49 from the value in the memory 52 stored at step S42.

The above-mentioned operation maintains a pitch of 42.3 μm between the first and second light beam passage positions. A similar operation provides a pitch of 42.3 μm between the third and fourth light beam passage positions.

As mentioned above, the first, second, and third embodiments can prevent saturation of an integration output as a result of detecting the amount of displacement from the light beam center. Such displacement can occur when an attempt is made to improve the detection accuracy by increasing a current/voltage converter's gain, increasing a differential amplifier's gain, or sensitizing the integrator's integration constant.

This can solve the problem that the integration output remains at the power supply voltage or the ground level to prevent a normal integration operation or light beam control. Namely, the first, second, and third embodiments make it possible to detect light beam positions in a wide range and improve accuracy in detecting a light beam position.

According to the fourth, fifth, and sixth embodiments, two sawtooth sensor patterns are combined in an engaged fashion and are arranged so that a light beam crosses sawtooth portions in the horizontal scan direction. If there occurs a saturated output from the processing circuit which processes an output signal from the sensor pattern, a correction signal is used for correction to detect a light beam position.

This makes it possible to increase a current/voltage conversion amplifier's gain, increase a differential amplifier's gain, or sensitize the integrator's integration constant in the processing circuit which processing a signal for detecting a light beam position. The detection accuracy can be further improved.

Like the fifth and sixth embodiments, even the light beam scanning apparatus having a plurality of light beams can improve the detection accuracy. This is because the correction is applied when the circuit for processing signals from the sensors generates a saturated output. It is possible to provide the light beam scanning apparatus which can accurately control positions of a plurality of light beams.

The first, second, and third embodiments can improve the detection accuracy just by changing the sensor patterns for detecting light beams. It is possible to easily improve accuracy for detecting light beam positions without adding a complicated circuit design or control. The fourth, fifth, and sixth embodiments can further improve the detection accuracy by changing the sensor patterns for light beam detection and performing correction when a saturated output results from the processing circuit for processing signals from the sensors.

Additional advantages and modifications will readily occur to those skilled in the art. Therefore the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A light beam scanning apparatus comprising:
    a light emitting device configured to output a light beam;
    a mirror configured to reflect a light beam toward a scanned face so that said light beam output from said light emitting device scans said scanned face in a horizontal scan direction;
    a plurality of sensors arranged on said scanned face or a position equivalent thereto, which detect a light beam scanned by said mirror and output an electric signal wherein said plurality of sensors comprises a plurality of first patterns outputs of which continuously increase and a plurality of second patterns outputs of which continuously decrease, in response to a change in a scanning position of the light beam in a direction orthogonal to the horizontal scan direction, and said plurality of first patterns and said plurality of second patterns are arranged alternately in the horizontal scan direction;
    a processing circuit configured to output a value obtained by integrating a difference between respective electric signals output from said plurality of sensors; and
    a control section configured to control a passage position of a light beam output from said light emitting device on said scanned face to a specified portion based on an output value from said processing circuit.

2. The light beam scanning apparatus according to claim 1, wherein said plurality of first patterns and said plurality of second of at least one of triangular and trapezoidal shape and said plurality of first patterns and said plurality of second patterns are arranged alternately in the horizontal scan direction such that the triangles or trapezoids are alternately inverted.

3. The light beam scanning apparatus according to claim 1, wherein said plurality of sensors comprise a pair of continuous triangular or trapezoid patterns, and said pair of patterns is combined so that a plurality of continuous triangular or trapezoid patterns is alternately engaged and is arranged so that one sensor output continuously increases and the other sensor output continuously decreases with a change of a light beam scan position in a direction orthogonal to said horizontal scan direction.

4. The light beam scanning apparatus according to claim 1, wherein said plurality of sensors comprise two sawtooth patterns, and said two patterns are combined so that sawtooth patterns engage with each other and are arranged so that a horizontal scan direction of said light beam crosses said sawtooth patterns.

5. The light beam scanning apparatus according to claim 1, wherein
said light emitting device outputs a plurality of light beams; and
said control section adjusts a pitch in the direction orthogonal to said horizontal scan direction for a plurality of light beams to a specified interval.

6. The light beam scanning apparatus according to claim 5, further comprising an optical path change member configured to change each light beam passage position under control of said control section.

7. The light beam scanning apparatus according to claim 1, further comprising a passage position detection sensor configured to determine whether a light beam output from said light emitting device passes a first passage position or a second passage position; wherein said first passage position is a first passage target and said second passage position is a second passage target away from said first passage target for a specified distance in the direction orthogonal to said horizontal scan direction; wherein
said light emitting device outputs a plurality of light beams; and
said control section adjusts a pitch in the direction orthogonal to said horizontal scan direction for a plurality of light beams output from said light emitting device to a specified interval based on an output value from said processing circuit, and said passage position detection sensor is used for control so that a light beam pitch matches a gap between the first passage target and the second passage target.

8. The light beam scanning apparatus according to claim 1, wherein
said control section has a function of outputting a correction control signal for correcting an electric signal output from said pair of sensors to said processing circuit and, as regards an output from said processing circuit, controls a passage position of the light beam output from said laser light emitting device on said scanned face based on the correction amount according to said correction control signal; and
said processing circuit corrects an electric signal output from said pair of sensors according to said correction control signal from said control section, integrates and outputs the corrected signal to a control section.

9. The light beam scanning apparatus according to claim 8, wherein
said control section receives an output from said processing circuit, and determines a passage position and controls a light beam to a specified position based on a position detection characteristic based on a correction amount according to said correction control signal.

10. The light beam scanning apparatus according to claim 8, wherein
said processing circuit has a correction pulse generation circuit for generating a correction pulse based on a correction control signal from said control section and corrects an electric signal from said pair of sensors using the correction pulse generated in said correction pulse generation circuit.

11. The light beam scanning apparatus according to claim 8, wherein
said light emitting device outputs a plurality of light beams; and
said control section adjusts a pitch in the direction orthogonal to said horizontal scan direction of a plurality of light beams to a specified interval.

12. The light beam scanning apparatus according to claim 8, further comprising:
a passage position detection sensor configured to determine whether the light beam output from said light emitting device passes a first passage position or a second passage position, wherein said first passage position is a first passage target and said second passage position is a second passage target away from said first passage target for a specified distance in the direction orthogonal to said horizontal scan direction; wherein
said light emitting device outputs a plurality of light beams; and
said control section adjusts a pitch in the direction orthogonal to said horizontal scan direction for a plurality of light beams output from said light emitting device to a specified interval based on an output value from said processing circuit, and said passage position detection sensor is used for control so that a light beam pitch matches a gap between the first passage target and the second passage target.

13. An image formation apparatus having an image support whose scanned face is used for scanning a light beam based on image information and forming a latent image and image formation means for forming an image formed on this image support on an image formation medium, comprising:
a light emitting device configured to output a light beam;
a mirror configured to reflect a light beam toward the scanned face so that said light beam output from said light emitting device scans said scanned face in a horizontal scan direction;
a plurality of sensors arranged on said scanned face or a position equivalent thereto which detect a light beam scanned by said mirror and output an electric signal wherein said plurality of sensors comprises a plurality of first patterns outputs of which continuously increase and a plurality of second patterns outputs of which continuously decrease, in response to a change in a scanning position of the light beam in a direction orthogonal to said horizontal scan direction, and said plurality of first patterns and said plurality of second patterns are arranged alternately in the horizontal scan direction;
a processing circuit configured to output a value obtained by integrating a difference between respective electric signals output from said pair of sensors; and
a control section configured to control a passage position of the light beam output from said light emitting device on said face to a specified position based on an output value from said processing circuit.

14. The image formation apparatus according to claim 13, wherein
said light emitting device outputs a plurality of light beams; and
said control section adjusts a pitch in a direction orthogonal to a horizontal scan direction of a plurality of light beams to a specified interval.

15. The image formation apparatus according to claim 13, further comprising:
a passage position detection sensor configured to determine whether the light beam output from said light emitting device passes a first passage position or a second passage position, wherein said first passage position is a first passage target and said second passage position is a second passage target away from said first passage target for a specified distance in the direction orthogonal to said horizontal scan direction; wherein said light emitting device outputs a plurality of light beams; and said control section adjusts a pitch in the direction orthogonal to said horizontal scan direction for a plurality of light beams output from said light emitting device to a specified interval based on an output value from said processing circuit, and said passage position detection sensor is used for control so that a light beam pitch matches a gap between the first passage target and the second passage target.

16. The image formation apparatus according to claim 13, wherein said control section has a function of outputting a correction control signal for correcting an electric signal output from said pair of sensors to said processing circuit and, as regards an output from said processing circuit, controls a passage position of the light beam output from said laser light emitting device on said scanned face based on the correction amount according to said correction control signal; and said processing circuit corrects an electric signal output from said pair of sensors according to said correction control signal from said control section, integrates and outputs the corrected signal to a control section.

17. The image formation apparatus according to claim 16, wherein said control section receives an output from said processing circuit, and determines a passage position and controls a light beam to a specified position based on a position detection characteristic based on the correction amount according to said correction control signal.

18. The image formation apparatus according to claim 16, wherein said processing circuit has a correction pulse generation circuit for generating a correction pulse based on a correction control signal from said control section and corrects an electric signal from said pair of sensors using a correction pulse generated in this correction pulse generation circuit.

19. The image formation apparatus according to claim 16, wherein said light emitting device outputs a plurality of light beams; and said control section adjusts a pitch in the direction orthogonal to said horizontal scan direction of a plurality of light beams to a specified interval.

20. The image formation apparatus according to claim 16, further comprising:

a passage position detection sensor configured to determine whether the light beam output from said light emitting device passes a first passage position or a second passage position; wherein said first passage position is a first passage target and said second passage position is a second passage target away from said first passage target for a specified distance in the direction orthogonal to said horizontal scan direction; wherein said light emitting device outputs a plurality of light beams; and said control section adjusts a pitch in the direction orthogonal to said horizontal scan direction for a plurality of light beams output from said light emitting device to a specified interval based on an output value from said processing circuit, and said passage position detection sensor is used for control so that a light beam pitch matches a gap between the first passage target and the second passage target.

* * * * *